(12) United States Patent
Mizuno et al.

(10) Patent No.: US 8,771,126 B2
(45) Date of Patent: Jul. 8, 2014

(54) TRACTION DRIVE MECHANISM

(75) Inventors: Yoshihiro Mizuno, Nagakute (JP);
Kisaburo Hayakawa, Nagoya (JP);
Hiroyuki Nishizawa, Tajimi (JP);
Hiroyuki Yamaguchi, Seto (JP);
Kiyokazu Sunami, Tajimi (JP)

(73) Assignee: Kabushiki Kaisha Toyota Chuo Kenkyusho, Nagakute-shi (JP)

( * ) Notice: Subject to any disclaimer, the term of this patent is extended or adjusted under 35 U.S.C. 154(b) by 13 days.

(21) Appl. No.: 13/811,097

(22) PCT Filed: Jun. 27, 2011

(86) PCT No.: PCT/JP2011/064649
§ 371 (c)(1),
(2), (4) Date: Jan. 18, 2013

(87) PCT Pub. No.: WO2012/014611
PCT Pub. Date: Feb. 2, 2012

(65) Prior Publication Data
US 2013/0123059 A1    May 16, 2013

(30) Foreign Application Priority Data
Jul. 26, 2010   (JP) ................................. 2010-167150

(51) Int. Cl.
*F16H 13/06* (2006.01)
(52) U.S. Cl.
USPC ............................ 475/183; 475/904; 475/903
(58) Field of Classification Search
CPC .................................................... F16H 13/08
USPC ......................................... 475/183, 903, 904
See application file for complete search history.

(56) References Cited

U.S. PATENT DOCUMENTS

| 5,435,794 | A | * | 7/1995 | Mori et al. | 475/343 |
| 6,013,002 | A | * | 1/2000 | Nonaka | 475/5 |
| 6,461,265 | B1 | * | 10/2002 | Graham et al. | 475/5 |
| 2012/0196720 | A1 | * | 8/2012 | Miyawaki et al. | 475/345 |

FOREIGN PATENT DOCUMENTS

| JP | A-50-22970 | 3/1975 | |
| JP | 58099549 A | * | 6/1983 | F16H 13/08 |
| JP | A-61-74952 | 4/1986 | |
| JP | U-61-96040 | 6/1986 | |
| JP | A-5-332413 | 12/1993 | |
| JP | A-7-54946 | 2/1995 | |

(Continued)

OTHER PUBLICATIONS

Kawano, "Planetary Roller Type Traction Drive Unit for Printing Machine," *Koyo Engineering Journal*, 2004, pp. 60-64, No. 165.

(Continued)

*Primary Examiner* — Justin Holmes
*Assistant Examiner* — Lillian Nguyen
(74) *Attorney, Agent, or Firm* — Oliff PLC

(57) ABSTRACT

Assuming that $N_1$ and $N_2$ are the respective numbers of pinion rollers (23, 63); $\rho_1$ is the ratio between the inner diameter of a ring roller (22) and the outer diameter of a sun roller (21); and $\rho_2$ is the ratio between the inner diameter of a ring roller (62) and the outer diameter of a sun roller (61); and it holds that $N_1=3$, and $(\rho_1+1)\times(\rho_2+1)\geq 24+16\times 2^{0.5}$, in the case where $N_2=3$, then it holds that $\rho_1 \geq 0.102\times(\rho_1+1)\times(\rho_2+1)+1.196$, and $\rho_1 \leq \min[0.204\times(\rho_1+1)\times(\rho_2+1)+3.123, 7+4\times 3^{0.5}]$, and in the case where $N_2=4$, then it holds that $\rho_1 \geq (2-2^{0.5})\times(\rho_1+1)\times(\rho_2+1)/4-1$, and $\rho_1 \leq \min[0.185\times(\rho_1+1)\times(\rho_2+1)+1.320, 7+4\times 3^{0.5}]$.

2 Claims, 15 Drawing Sheets

(56) References Cited

FOREIGN PATENT DOCUMENTS

| JP | B-7-21303 | 3/1995 |
| JP | A-9-42398 | 2/1997 |
| JP | A-2007-71248 | 3/2007 |

OTHER PUBLICATIONS

International Search Report issued in International Application No. PCT/JP2011/064649 dated Aug. 23, 2011 (w/translation).
Japanese Office Action issued in Japanese Patent Application No. 2010-167150 on Mar. 12, 2013 (with translation).

* cited by examiner

SECTION A - A

SECTION B - B

SECTION B - B

SECTION B - B

SECTION B - B

TRACTION DRIVE MECHANISM

TECHNICAL FIELD

The present invention relates to a traction drive mechanism that uses a planetary roller mechanism.

RELATED ART

Related art examples of a traction drive mechanism that uses a planetary roller mechanism are disclosed in Patent documents 1 and 2 below. In the traction drive mechanisms according to Patent documents 1 and 2, a ring roller of a first planetary roller mechanism and a ring roller of a second planetary roller mechanism are fixed, and a carrier of the first planetary roller mechanism is coupled to a sun roller of the second planetary roller mechanism such that the first planetary roller mechanism and the second planetary roller mechanism are connected in series. The traction drive mechanisms according to Patent documents 1 and 2 function as speed reducing mechanisms. Power input to a sun roller of the first planetary roller mechanism is reduced in speed by the first planetary roller mechanism, and then transmitted to the sun roller of the second planetary roller mechanism from the carrier of the first planetary roller mechanism, and further reduced in speed by the second planetary roller mechanism and output from a carrier of the second planetary roller mechanism. Nonpatent document 1 below also discloses a planetary roller mechanism in which four pinion rollers (planetary rollers) are arranged along the circumferential direction of a ring roller.

PRIOR PATENT DOCUMENTS

Patent Literatures
   [Patent Document 1] JP 61-74952 A
   [Patent Document 2] JP 7-54946 A
   [Patent Document 3] JP 5-332413 A
   [Patent Document 4] JP 7-21303 A
Nonpatent Document
   [Nonpatent Document 1] Akihiko Kano, "Regarding planetary roller type traction drive speed reducing unit for printing machine", Koyo Engineering Journal No. 165, 2004, p. 60-64

DISCLOSURE OF THE INVENTION

Problem to be Solved by the Invention

In order to transmit torque in a planetary roller mechanism, press force (normal force) required for the torque transmission needs to be applied to a contact portion between a sun roller and a pinion roller (planetary roller) and to a contact portion between the pinion roller and a ring roller so that no excessive slip (gross slip) is generated at these contact portions. When the press force is applied to each contact portion, the ring roller is elastically deformed diametrically outward in response to reaction force from the pinion roller. The amount of the diametrically outward deformation of the ring roller varies with circumferential position, and is maximal at the circumferential position of the portion to contact the pinion roller and is smaller with greater distance from the portion to contact the pinion roller. If the pinion roller relatively revolves around the ring roller, the circumferential position of the contact portion between the pinion roller and the ring roller periodically changes. Therefore, the ring roller is repeatedly diametrically deformed by the periodic changes of the circumferential position at which the amount of the diametrically outward deformation of the ring roller is maximal. The repeated deformation of the ring roller causes vibrations and noise, and the levels of the vibrations and noise resulting from the repeated deformation of the ring roller are higher when the amount of the diametrical deformation of the ring roller is greater.

In the planetary roller mechanism, the ratio between the inner diameter of the ring roller and the outer diameter of the sun roller need to be designed so that the pinion rollers arranged along the circumferential direction do not interfere with one another. Therefore, a speed change ratio (reduction ratio) obtainable by the planetary roller mechanism is also limited to a range lower than an upper limit value corresponding to the number of pinion rollers. For example, according to Nonpatent Document 1 in which four pinion rollers are arranged along the circumferential direction, the ratio between the inner diameter of the ring roller and the outer diameter of the sun roller at which the four pinion rollers do not interfere with one another is limited to a range lower than an upper limit value $(3+2\times2^{0.5})\approx5.83$. Thus, when the ring roller is fixed, the reduction ratio ranging from the sun roller to the carrier is limited to a range lower than an upper limit value $(4+2\times2^{0.5})\approx6.83$, and a reduction ratio equal to or greater than this upper limit value $(4+2\times2^{0.5})$ cannot be obtained. Even if the first planetary roller mechanism and the second planetary roller mechanism are connected in series in two stages as in Patent Documents 1 and 2 to further increase the reduction ratio, the reduction ratio ranging from the sun roller of the first planetary roller mechanism to the carrier of the second planetary roller mechanism is limited to a range lower than an upper limit value $(4+2\times2^{0.5})^2=(24+16\times2^{0.5})\approx46.6$, and a reduction ratio equal to or greater than this upper limit value $(24+16\times2^{0.5})$ cannot be obtained. If the planetary roller mechanisms are connected in series in three or more stages to further increase the reduction ratio, the structure of the traction drive mechanism is increased in size.

In order to further increase the reduction ratio without the increase in size of the structure of the traction drive mechanism, it is possible to reduce the number of pinion rollers arranged along the circumferential direction and thus increase the reduction ratio obtainable by the planetary roller mechanism per stage. However, if the number of pinion rollers arranged along the circumferential direction is reduced, the number of the contact portions between the sun roller and the pinion roller and the number of the contact portions between the pinion roller and the ring roller are also reduced, and the capacity of transmission torque is also reduced accordingly. Therefore, the press force applied to each contact portion needs to be increased to compensate for the reduction of the transmission torque capacity. However, if the press force applied to each contact portion is increased, the amount of the diametrical deformation of the ring roller is also increased, and the levels of the vibrations and noise resulting from the repeated deformation of the ring roller also rise accordingly. If two or fewer pinion rollers are arranged along the circumferential direction, the position of the sun roller pressed to the pinion roller is not stable, and stable application of press force to each contact portion is difficult.

An advantage of the present invention is to provide a traction drive mechanism which can reduce vibrations and noise resulting from the repeated diametrical deformation of a ring roller and to also increase the reduction ratio without the increase in size of the structure.

Means for Solving the Problem

A traction drive mechanism according to the present invention comprises a first planetary roller mechanism and a second planetary roller mechanism that are connected in series. The first planetary roller mechanism includes a plurality of first planetary rollers rotatably supported by a first carrier. The first planetary rollers are held in contact between a first sun roller and a first ring roller. The second planetary roller mechanism includes a plurality of second planetary rollers rotatably supported by a second carrier. The second planetary rollers are held in contact between a second sun roller and a second ring roller. In the traction drive mechanism, $$N_1=3, N_2=3, 4, 5, \text{ or } 6, \text{ and}$$

$$(\rho_1+1)\times(\rho_2+1) \geq 24 + 16\times 2^{0.5}$$

where $N_1$ is the number of the first planetary rollers, $N_2$ is the number of the second planetary rollers, $\rho_1$ is the ratio between the inner diameter of first ring roller and the outer diameter of the first sun roller, and $\rho_2$ is the ratio between the inner diameter of the second ring roller and the outer diameter of the second sun roller.

In the traction drive mechanism according to the present invention, provided that $N_2=3$, $$\rho_1 \geq 0.102\times(\rho_1+1)\times(\rho_2+1)+1.196, \text{ and}$$

$$\rho_1 \leq \min[0.204\times(\rho_1+1)\times(\rho_2+1)+3.123, 7+4\times 3^{0.5}]$$

when the value of a smaller one of $(0.204\times(\rho_1+1)\times(\rho_2+1)+3.123)$ and $(7+4\times 3^{0.5})$ is $\min[0.204\times(\rho_1+1)\times(\rho_2+1)+3.123, 7+4\times 3^{0.5}]$.

In the traction drive mechanism according to the present invention, provided that $N_2=4$, $$\rho_1 \geq (2-2^{0.5})\times(\rho_1+1)\times(\rho_2+1)/4-1, \text{ and}$$

$$\rho_1 \leq \min[0.185\times(\rho_1+1)\times(\rho_2+1)+1.320, 7+4\times 3^{0.5}]$$

when the value of a smaller one of $(0.185\times(\rho_1+1)\times(\rho_2+1)+1.320)$ and $(7+4\times 3^{0.5})$ is $\min[0.185\times(\rho_1+1)\times(\rho_2+1)+1.320, 7+4\times 3^{0.5}]$.

In the traction drive mechanism according to the present invention, provided that $N_2=5$, $$\rho_1 \geq 0.206\times(\rho_1+1)\times(\rho_2+1)-1, \text{ and}$$

$$\rho_1 \leq \min[0.234\times(\rho_1+1)\times(\rho_2+1)-0.480, 7+4\times 3^{0.5}]$$

when the value of a smaller one of $(0.234\times(\rho_1+1)\times(\rho_2+1)-0.480)$ and $(7+4\times 3^{0.5})$ is $\min[0.234\times(\rho_1+1)\times(\rho_2+1)-0.480, 7+4\times 3^{0.5}]$.

In the traction drive mechanism according to the present invention, provided that $N_2=6$, $$\rho_1 \geq 0.25\times(\rho_1+1)\times(\rho_2+1)-1, \text{ and}$$

$$\rho_1 \leq \min[0.278\times(\rho_1+1)\times(\rho_2+1)-0.603, 7+4\times 3^{0.5}]$$

when the value of a smaller one of $(0.278\times(\rho_1+1)\times(\rho_2+1)-0.603)$ and $(7+4\times 3^{0.5})$ is $\min[0.278\times(\rho_1+1)\times(\rho_2+1)-0.603, 7+4\times 3^{0.5}]$.

In one aspect of the present invention, it is preferable that the second sun roller is coupled to the first carrier and that the rotations of the first and second ring rollers are constrained.

Advantage of the Invention

According to the present invention, it is possible to reduce vibrations and noise resulting from the repeated diametrical deformation of the first and second ring rollers, and also increase the speed change ratio of the whole traction drive mechanism without the increase in size of the structure of the traction drive mechanism.

MODE FOR CARRYING OUT THE INVENTION

Hereinafter, a mode for carrying out the present invention (hereinafter referred to as an embodiment) will be described with reference to the drawings.

Figure 1:
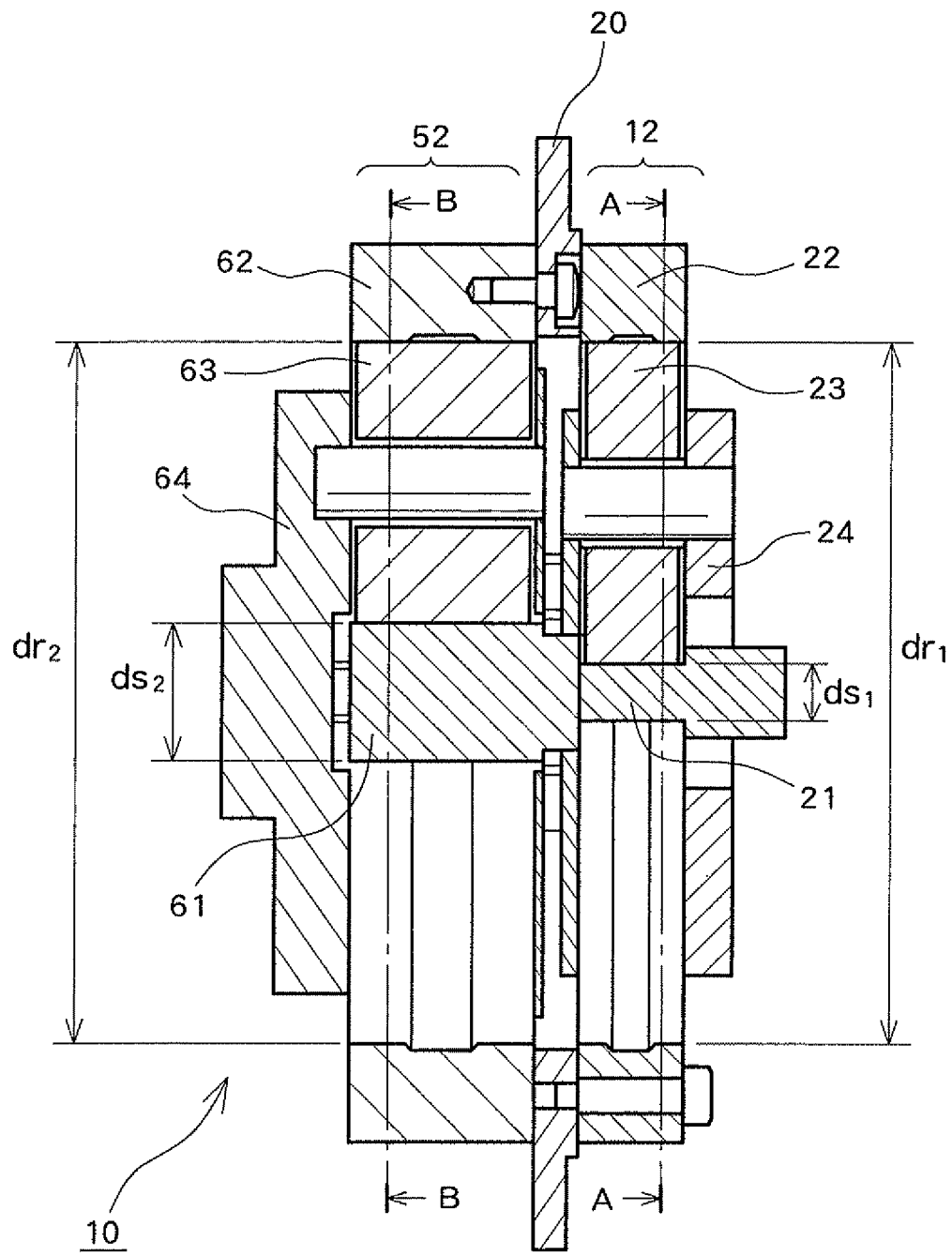
FIG. 1 is a view showing the schematic configuration of a traction drive mechanism according to an embodiment of the present invention.
Figure 2:
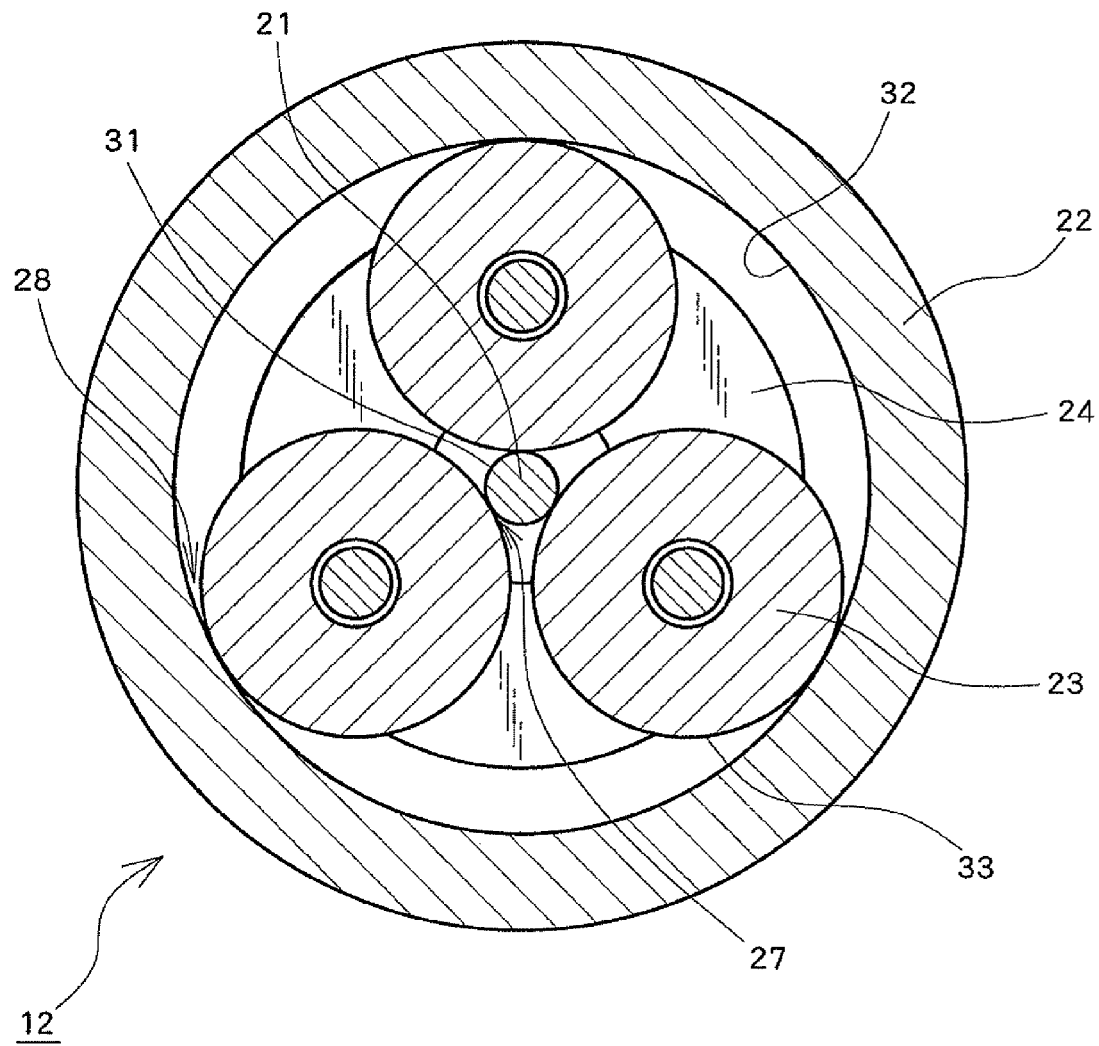
FIG. 2 is a view showing the schematic configuration of the traction drive mechanism according to the embodiment of the present invention.
Figure 3:
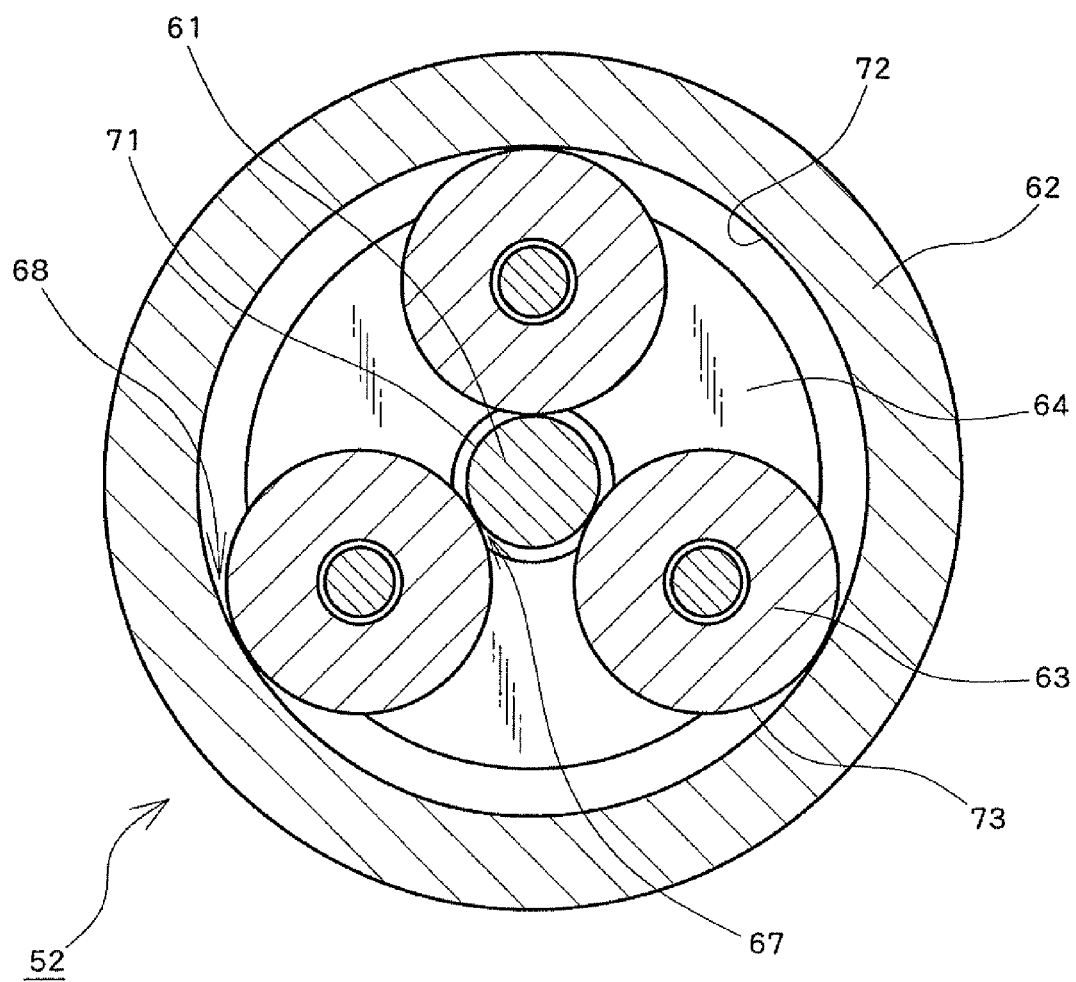
FIG. 3 is a view showing the schematic configuration of the traction drive mechanism according to the embodiment of the present invention.

FIGS. 1 to 3 are views showing the schematic configuration of a traction drive mechanism 10 according to the embodiment of the present invention. FIG. 1 shows a sectional view from a direction that intersects at right angles with the central axis direction (axis line direction) of ring rollers 22 and 62. FIG. 2 shows a sectional view taken along the line A-A of FIG. 1. FIG. 3 shows a sectional view taken along the line B-B of FIG. 1. The traction drive mechanism 10 according to the present embodiment comprises two planetary roller mechanisms 12 and 52 connected in series.

The planetary roller mechanism (first planetary roller mechanism) 12 has the ring roller (first ring roller) 22 in which an inner peripheral surface (first inner peripheral surface) 32 is formed, a sun roller (first sun roller) 21 disposed on the inner side (diametrically inner side) of the inner peripheral surface 32 of the ring roller 22, a plurality of pinion rollers (first planetary rollers) 23 which are arranged at intervals along the circumferential direction of the inner peripheral surface 32 of the ring roller 22 and which are each held (press-held) in contact between an outer peripheral surface 31 of the sun roller 21 and an inner peripheral surface 32 of the ring roller 22, and a carrier (first carrier) 24 which rotatably supports each of the pinion rollers 23. The pinion rollers 23 are arranged at equal intervals (or at substantially equal intervals) in the circumferential direction of the inner peripheral surface 32 of the ring roller 22. The central axes (axis lines) of the sun roller 21, the ring roller 22, and the carrier 24 correspond to one another. The rotation central axis (axis line) of each of the pinion rollers 23 when rotating on its axis is parallel to the central axis of the ring roller 22.

The planetary roller mechanism (second planetary roller mechanism) 52 has the ring roller (second ring roller) 62 which is disposed at a distance in its axis line direction from the ring roller 22 and in which an inner peripheral surface (second inner peripheral surface) 72 is formed, a sun roller (second sun roller) 61 disposed on the inner side (diametrically inner side) of the inner peripheral surface 72 of the ring roller 62, a plurality of pinion rollers (second planetary rollers) 63 which are arranged at intervals along the circumferential direction of the inner peripheral surface 72 of the ring roller 62 and which are each held (press-held) in contact between an outer peripheral surface 71 of the sun roller 61 and the inner peripheral surface 72 of the ring roller 62, and a carrier (second carrier) 64 which rotatably supports each of the pinion rollers 63. The pinion rollers 63 are arranged at equal intervals (or at substantially equal intervals) in the circumferential direction of the inner peripheral surface 72 of the ring roller 62. The central axes (axis lines) of the sun roller 61, the ring roller 62, and the carrier 64 correspond to one another, and also correspond to the central axes (axis lines) of the sun roller 21, the ring roller 22, and the carrier 24. The rotation central axis (axis line) of each of the pinion rollers 63 when rotating on its axis is parallel to the central axis of the ring roller 62. In the example shown in FIGS. 1 to 3, the ring rollers 22 and 62 are fixed to a casing 20 (fixed member with fixed rotation). Fixed rings in which the inner peripheral surfaces 32 and 72 respectively contacting outer peripheral surfaces 33 and 37 of the pinion rollers 23 and 63 are configured by the ring rollers 22 and 62. The sun roller 61 of the planetary roller mechanism 52 is mechanically coupled to the carrier 24 of the planetary roller mechanism 12, and the planetary roller mechanism 12 and the planetary roller mechanism 52 are mechanically connected in series.

In the planetary roller mechanisms 12 and 52 (the traction drive mechanism 10), torque can be transmitted by the shearing force (tangential traction force) of oil films of the rollers generated by the application of press force (normal force) to a contact portion via the oil films. In the meantime, in torque transmission, it is necessary to apply press force (normal force) required for the torque transmission to each contact portion so that no excessive slip (gross slip) is generated in each contact portion. In the planetary roller mechanism 12, in order to apply press force (normal force) to a contact portion 27 between the outer peripheral surface 31 of the sun roller 21 and the outer peripheral surface 33 of each of the pinion rollers 23 and to a contact portion 28 between the outer peripheral surface 33 of each of the pinion rollers 23 and the inner peripheral surface 32 of the ring roller 22, the sun roller 21 and each of the pinion rollers 23 are fitted into the ring roller 22, for example, by shrinkage fitting or tight fitting, and an interference is generated in the planetary roller mechanism 12. The ring roller 22 is elastically deformed diametrically outward by the interference, and diametrical inward (toward the pinion rollers 23) elastic force (restoring force) is thereby generated. The ring roller 22 presses each of the pinion rollers 23 toward the sun roller 21 by the elastic force, and can thereby apply normal force to the contact portions 27 and 28. Similarly, in the planetary roller mechanism 52, the sun roller 61 and each of the pinion rollers 63 are fitted into the ring roller 62, for example, by shrinkage fitting or tight fitting, and an interference is generated in the planetary roller mechanism 52. Thereby, press force can be applied to a contact portion 67 between the outer peripheral surface 71 of the sun roller 61 and the outer peripheral surface 73 of each of the pinion rollers 63 and to a contact portion 68 between the outer peripheral surface 73 of each of the pinion rollers 63 and the inner peripheral surface 72 of the ring roller 62. It is also possible to provide a known press force applying mechanism to apply press force to the contact portions 27, 28, 67, and 68. The normal force is thus applied to the contact portions 27, 28, 67, and 68. Consequently, tangential traction force can be generated in the contact portions 27, 28, 67, and 68, and torque can be transmitted between the sun roller 21 and each of the pinion rollers 23, between each of the pinion rollers 23 and the ring roller 22, between the sun roller 61 and the pinion rollers 63, and between the pinion rollers 63 and the ring roller 62.

An interference $a_1$ generated in the planetary roller mechanism 12 is represented by Equation (1) below in which $ds_1$ is the outer diameter of the sun roller 21 (the outer peripheral surface 31), $dp_1$ is the outer diameter of the pinion roller 23 (the outer peripheral surface 33), and $dr_1$ is the inner diameter of the ring roller 22 (the inner peripheral surface 32). Similarly, an interference $a_2$ generated in the planetary roller mechanism 52 is represented by Equation (2) below in which $ds_2$ is the outer diameter of the sun roller 61 (the outer peripheral surface 71), $dp_2$ is the outer diameter of the pinion roller 63 (the outer peripheral surface 73), and $dr_2$ is the inner diameter of the ring roller 62 (the inner peripheral surface 72).

$$a_1=(ds_1+2\times dp_1-dr_1)/2 \qquad (1)$$

$$a_2=(ds_2+2\times dp_2-dr_2)/2 \qquad (2)$$

The traction drive mechanism 10 according to the present embodiment can be used as a speed changing mechanism. In the example shown in FIGS. 1 to 3, the ring rollers 22 and 62 are fixed to the casing 20, and the rotations of the ring rollers 22 and 62 are constrained. Thus, power can be transmitted with reduced speed between the sun roller 21 and the carrier 64. When power is transmitted to the carrier 64 from the sun roller 21, the traction drive mechanism 10 functions as a speed reducing mechanism for transmitting power with reduced speed to the carrier 64 from the sun roller 21. In this case, power is transmitted with reduced speed to the carrier 24 from the sun roller 21 in the planetary roller mechanism 12, and power is transmitted with reduced speed to the carrier 64 from the sun roller 61 coupled to the carrier 24 in the planetary roller mechanism 52. However, the traction drive mechanism 10 can also function as a speed increasing mechanism for transmitting power with increased speed to the sun roller 21 from the carrier 64.

In the traction drive mechanism 10 functioning as the speed reducing mechanism, a theoretical speed change ratio (reduction ratio) $e_1$ of the planetary roller mechanism 12 from the sun roller 21 to the carrier 24 when no slip is assumed to be generated in the contact portions 27 and 28 is represented by Equation (3) below that uses the outer diameter $ds_1$ of the sun roller 21 (the outer peripheral surface 31) and the inner diameter $dr_1$ of the ring roller 22 (the inner peripheral surface 32). A theoretical speed change ratio (reduction ratio) $e_2$ of the planetary roller mechanism 52 from the sun roller 61 to the carrier 64 when no slip is assumed to be generated in the contact portions 67 and 68 is represented by Equation (4) below that uses the outer diameter $ds_2$ of the sun roller 61 (the outer peripheral surface 71) and the inner diameter $dr_2$ of the ring roller 62 (the inner peripheral surface 72). A theoretical total speed change ratio (total reduction ratio) $e_0$ of the traction drive mechanism 10 from the sun roller 21 to the carrier 64 when no slip is assumed to be generated in the contact portions 27, 28, 67, and 68 is represented by Equation (5) below. However, slight slip is generated in the contact portions 27, 28, 67, and 68 during torque transmission. Therefore, strictly speaking, there is a small difference of the slight slipping between an actual speed change ratio (reduction ratio) and the theoretical speed change ratio (total reduction ratio).

$$e_1 = dr_1/ds_1 + 1 \tag{3}$$

$$e_2 = dr_2/ds_2 + 1 \tag{4}$$

$$e_0 = e_1 \times e_2 = (dr_1/ds_1 + 1) \times (dr_2/ds_2 + 1) \tag{5}$$

Figure 4:
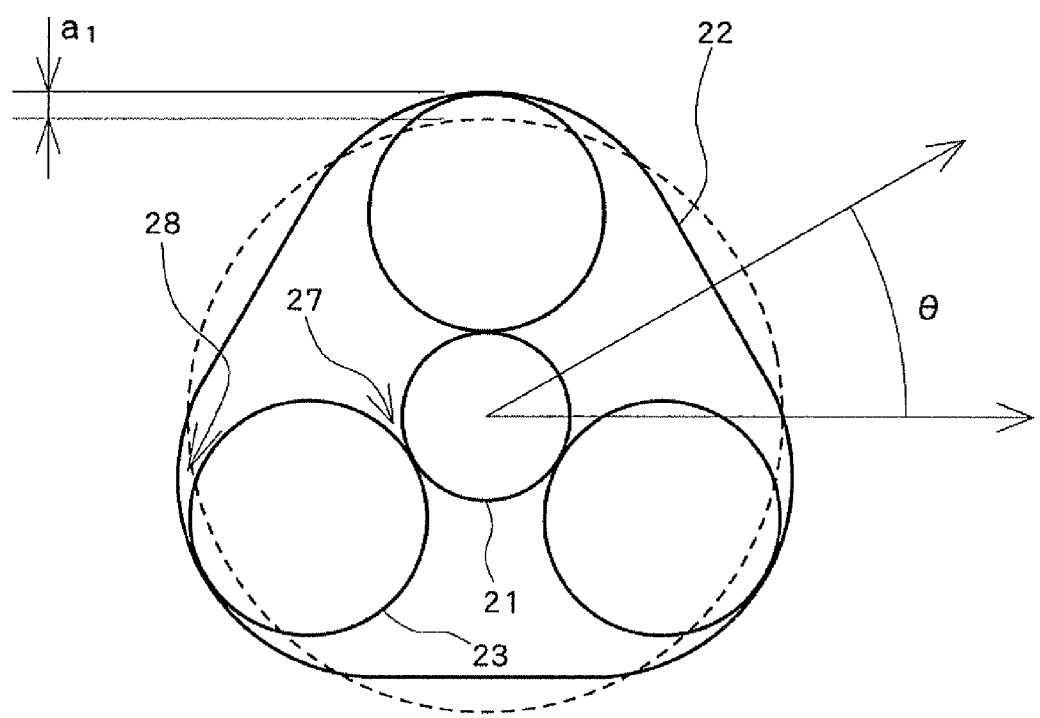
FIG. 4 is a view illustrating the deformation of a ring roller.

In the planetary roller mechanism 12, when press force is applied to the contact portions 27 and 28, the ring roller 22 is subjected to the reaction force from each of the pinion rollers 23, for example, as shown in FIG. 4, and is elastically deformed diametrically outward. It should be noted that the deformation amount of the ring roller 22 is shown to be greater than an actual deformation amount for convenience of explanation in FIG. 4. The amount of the diametrically outward deformation of the ring roller 22 varies with circumferential positions, and is maximal at the circumferential position of the portion 28 to contact the pinion roller 23 and is smaller at a greater distance from the portion 28 to contact the pinion roller 23. If relative rotation is generated between the ring roller 22 and the carrier 24 (the pinion roller 23 relatively revolves around the ring roller 22), the circumferential position of the contact portion 28 periodically changes. Therefore, the ring roller 22 is repeatedly diametrically deformed by the periodic changes of the circumferential position at which the amount of the diametrically outward deformation of the ring roller 22 is maximal. Similarly, in the planetary roller mechanism 52, the ring roller 62 is repeatedly diametrically deformed. The repeated deformation of the ring rollers 22 and 62 causes vibration and noise.

A diametrical vibration displacement $r_1$ at a circumferential position θ of the ring roller 22 and a diametrical vibration displacement $r_2$ at a circumferential position θ of the ring roller 62 are both represented by sinusoidal waves, and are respectively represented by Equations (6) and (7) below. In Equations (6) and (7), $a_1$ is an interference (see Equation (1)) in the planetary roller mechanism 12, $a_2$ is an interference (see Equation (2)) in the planetary roller mechanism 52, $\omega_1$ is the rotation speed of the carrier 24, $\omega_2$ is the rotation speed of the carrier 64, and t is time.

$$r_1 = a_1 \times \cos(\omega_1 t + \theta) \tag{6}$$

$$r_2 = a_2 \times \cos(\omega_2 t + \theta) \tag{7}$$

The rotation speed $\omega_1$ of the carrier 24 and the rotation speed $\omega_2$ of the carrier 64 are respectively represented by Equations (8) and (9) below. In Equations (8) and (9), $\omega_{in}$ is the rotation speed (input rotation speed) of the sun roller 21, $N_1$ is the number of the pinion rollers 23 arranged along the circumferential direction, $N_2$ is the number of the pinion rollers 63 arranged along the circumferential direction, $e_1$ is the speed change ratio (see Equation (3)) of the planetary roller mechanism 12 from the sun roller 21 to the carrier 24, and $e_2$ is the speed change ratio (see Equation (4)) of the planetary roller mechanism 52 from the sun roller 61 to the carrier 64.

$$\omega_1 = \omega_{in} \times N_1/e_1 \tag{8}$$

$$\omega_2 = \omega_{in} \times N_2/(e_1 \times e_2) \tag{9}$$

A diametrical vibration speed $v_1$ at a circumferential position θ of the ring roller 22 and a diametrical vibration speed $v_2$ at a circumferential position θ of the ring roller 62 are respectively represented by Equations (10) and (11) below in accordance with the time derivative of Equations (6) and (7).

$$v_1 = -a_1 \times \omega_1 \times \sin(\omega_1 t + \theta) \tag{10}$$

$$v_2 = -a_2 \times \omega_2 \times \sin(\omega_2 t + \theta) \tag{11}$$

Vibration power $P_0$ of the ring rollers 22 and 62 is calculated by integrating, over the circumferences of the ring rollers 22 and 62, the sum $(m_1 \times v_1 + m_2 \times v_2)$ of the product $m_1 \times v_1$ of a mass $m_1$ and a speed $v_1$ per unit θ at a circumferential position θ of the ring roller 22 and the product $m_2 \times v_2$ of a mass $m_2$ and a speed $v_2$ per unit θ at a circumferential position θ of the ring roller 62. The vibration power $P_0$ is represented by Equation (12) below. In Equation (12), $M_1$ is the mass of the ring roller 22, and $M_2$ is the mass of the ring roller 62. As represented by Equation (12), the vibration power $P_0$ of the ring rollers 22 and 62 varies with a reduction ratio $e_1$ of the planetary roller mechanism 12 (the ratio $\rho_1$ between the inner diameter $dr_1$ of the ring roller 22 and the outer diameter $ds_1$ of the sun roller 21), the masses $M_1$ and $M_2$ of the ring rollers 22 and 62, the interferences $a_1$ and $a_2$ in the planetary roller mechanisms 12 and 52, and the numbers $N_1$ and $N_2$ of the pinion rollers 23 and 63. In order to lower the levels of vibration and noise resulting from the repeated deformation of the ring rollers 22 and 62, it is preferable to reduce the vibration power $P_0$ represented by Equation (12).

[Expression 1]

Figure 5:
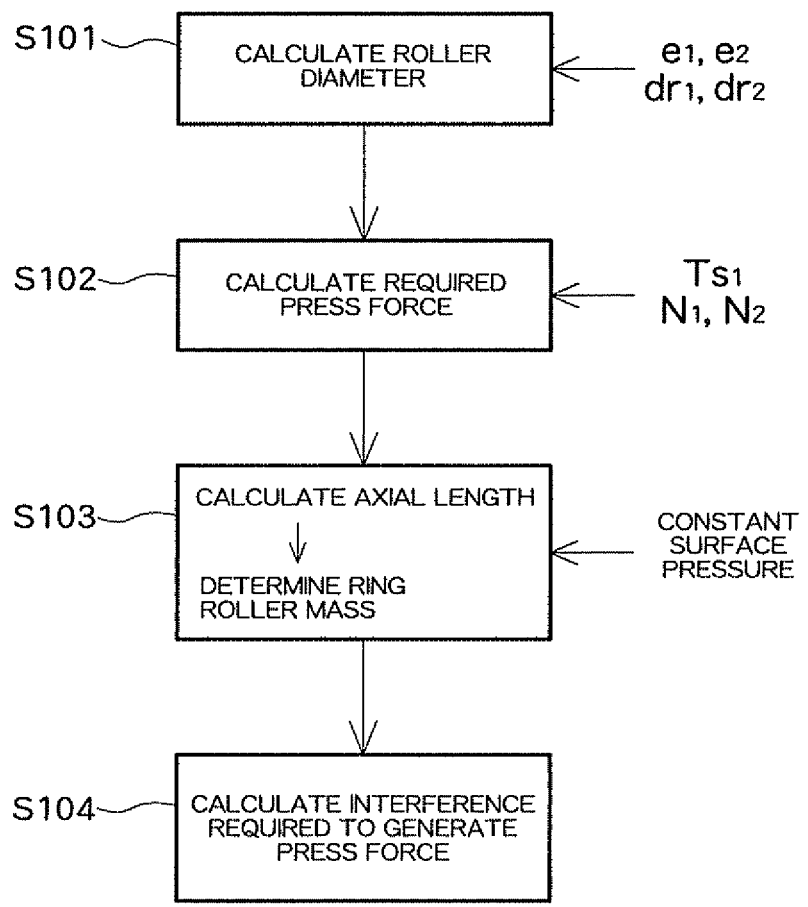
FIG. 5 is a flowchart illustrating one example of a method of designing a planetary roller mechanism.

An example of a method of designing the planetary roller mechanisms 12 and 52 (the masses $M_1$ and $M_2$ of the ring rollers 22 and 62, and the interferences $a_1$ and $a_2$ in the planetary roller mechanisms 12 and 52) is shown in a flowchart in FIG. 5. First, in step S101, the outer diameters $ds_1$ and $ds_2$ of the sun rollers 21 and 61 (the outer peripheral surfaces 31 and 71) and the outer diameters $dp_1$ and $dp_2$ of the pinion rollers 23 and 63 (the outer peripheral surfaces 33 and 73) are calculated relative to the given reduction ratios $e_1$ and $e_2$ of the planetary roller mechanisms 12 and 52 and relative to the inner diameters $dr_1$ and $dr_2$ (constant values) of the ring rollers 22 and 62 (the inner peripheral surfaces 32 and 72). In the example shown in FIGS. 1 to 3, the reduction ratio $e_1$ of the planetary roller mechanism 12 is higher than the reduction ratio $e_2$ of the planetary roller mechanism 52. Therefore, the ratio $\rho_1$ ($=dr_1/ds_1$) between the inner diameter $dr_1$ of the ring roller 22 and the outer diameter $ds_1$ of the sun roller 21 is higher than the ratio $\rho_2$ ($=dr_2/ds_2$) between the inner diameter $dr_2$ of the ring roller 62 and the outer diameter $ds_2$ of the sun roller 61. Moreover, the inner diameters $dr_1$ and $dr_2$ of the ring rollers 22 and 62 are equal to each other. Therefore, the outer diameter $ds_1$ of the sun roller 21 is smaller than the outer diameter $ds_2$ of the sun roller 61, and the outer diameter $dp_1$ of the pinion rollers 23 is larger than the outer diameter $dp_2$ of the pinions roller 63. In step S102, press forces $Fs_1$ and $Fs_2$ required for the contact portions 27 and 67 are then calculated by Equations (13) and (14) below relative to given input torque (torque input to the sun roller 21) $Ts_1$ and relative to the numbers $N_1$ and $N_2$ of the pinion rollers 23 and 63. In Equations (13) and (14), $Ts_2$ is the torque ($=e_1 \times Ts_1$) of the sun roller 61, and $\mu$ is a traction coefficient in the contact portions 27 and 67.

$$Fs_1 = Ts_1/(\mu \times ds_1 \times N_1) \qquad (13)$$

$$Fs_2 = Ts_2/(\mu \times ds_2 \times N_2) \qquad (14)$$

In step S103, the axial lengths (the lengths of the contact portions 27, 28, 67, and 68 in the axis line direction) of the sun rollers 21 and 61, the pinion rollers 23 and 63, and the ring rollers 22 and 62 are then calculated relative to the surface pressures $Ps_1$ and $Ps_2$ (constant values) in the given contact portions 27 and 67, and the masses $M_1$ and $M_2$ of the ring rollers 22 and 62 are calculated. In the example shown in FIGS. 1 to 3, the axial lengths (the lengths of the contact portions 67 and 68 in the axis line direction) of the sun roller 61, the pinion roller 63, and the ring roller 62 of the planetary roller mechanism 52 are greater than the axial lengths (the lengths of the contact portions 27 and 28 in the axis line direction) of the sun roller 21, the pinion roller 23, and the ring roller 22 of the planetary roller mechanism 12. In step S104, the interferences $a_1$ and $a_2$ in the planetary roller mechanisms 12 and 52 required to apply the press force $Fs_1$ and $Fs_2$ to the contact portions 27 and 67 are then calculated.

Figure 6:
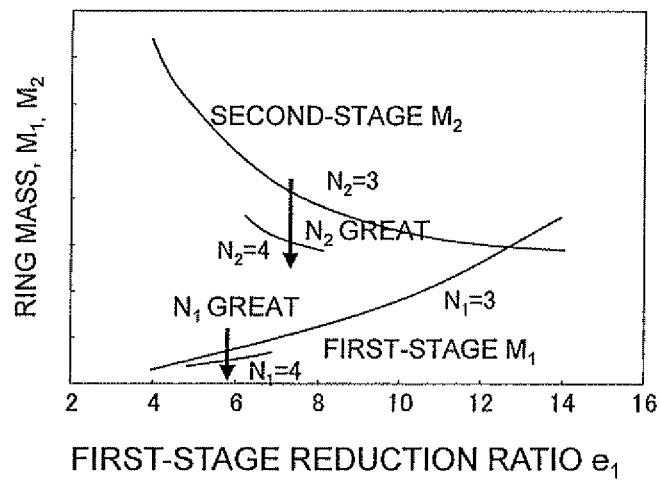
FIG. 6 is a graph illustrating the relation between the reduction ratio of the planetary roller mechanism and the masses of the ring rollers.

FIG. 6 shows the result of the calculation of the relation between the reduction ratio $e_1$ of the planetary roller mechanism 12 and the masses $M_1$ and $M_2$ of the ring rollers 22 and 62 when the planetary roller mechanisms 12 and 52 are designed in accordance with the flowchart in FIG. 5 provided that the total reduction ratio $e_0$ is constant, the inner diameters $dr_1$ and $dr_2$ of the ring rollers 22 and 62 are constant, the input torque $Ts_1$ is constant, and the surface pressures $Ps_1$ and $Ps_2$ in the contact portions 27 and 67 are constant. As shown in FIG. 6, the mass $M_1$ of the ring roller 22 is greater when the reduction ratio (first-stage reduction ratio) $e_1$ of the planetary roller mechanism 12 is higher. This is attributed to the fact that the axial length of the ring roller 22 needs to be increased to inhibit the increase in the surface pressure $Ps_1$ of the contact portion 27 in response to the decrease in the outer diameter $ds_1$ of the sun roller 21 when the first-stage reduction ratio $e_1$ is higher. The masses $M_1$ and $M_2$ of the ring rollers 22 and 62 are reduced by the increase in the numbers $N_1$ and $N_2$ of the pinion rollers 23 and 63, but the effect of mass reduction is particularly higher in the planetary roller mechanism 52 (second stage). As shown in FIG. 6, the masses $M_1$ and $M_2$ of the ring rollers 22 and 62 change with the change of the reduction ratio $e_1$ of the planetary roller mechanism 12, and the vibration power $P_0$ represented by Equation (12) also changes. In accordance with Equation (12), the vibration power $P_0$ tends to be lower when the masses $M_1$ and $M_2$ of the ring rollers 22 and 62 are smaller.

Figure 7:
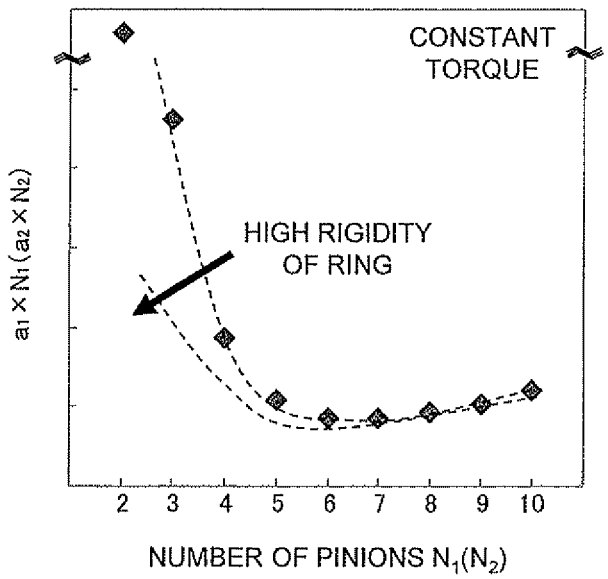
FIG. 7 is a graph illustrating the relation between the number of pinion rollers and an interference in the planetary roller mechanism.

FIG. 7 shows the result of calculation of the relation between the number $N_1$ of the pinion rollers 23 of the planetary roller mechanism 12 and the product $a_1 \times N_1$ when the planetary roller mechanisms 12 and 52 are designed in accordance with the flowchart in FIG. 5, provided that the total reduction ratio $e_0$ is constant, the inner diameters $dr_1$ and $dr_2$ of the ring rollers 22 and 62 are constant, the input torque $Ts_1$ is constant, and the surface pressures $Ps_1$ and $Ps_2$ in the contact portions 27 and 67 are constant. In the planetary roller mechanism 12, the transmission torque $Ts_1$ in the contact portion 27 is proportional to the press force $Fs_1$ and the number $N_1$ of the pinion rollers 23, and the press force $Fs_1$ is correlated with the interference $a_1$. When the transmission torque $Ts_1$ is constant, the press force $Fs_1$; that is, the interference $a_1$, decreases with the increase of the number $N_1$ of the pinion rollers 23. Moreover, the decrease rate of the interference $a_1$ is higher than the increase rate of the number $N_1$ of the pinion rollers 23. Thus, as shown in FIG. 7, the product $a_1 \times N_1$ decreases with the increase of the number $N_1$ of the pinion rollers 23 when $N_1 \leq 5$, and the product $a_1 \times N_1$ is minimal when $N_1 = 6$. However, when $N_1 \geq 7$, the decrease rate of the interference $a_1$ is lower than the increase rate of the number $N_1$ of the pinion rollers 23, so that the product $a_1 \times N_1$ increases with the increase of the number $N_1$ of the pinion rollers 23. The relation between the number $N_2$ of the pinion rollers 63 of the planetary roller mechanism 52 and the product $a_2 \times N_2$ is similar to the relation shown in FIG. 7. As shown in FIG. 7, the products $a_1 \times N_1$ and $a_2 \times N_2$ change with the numbers $N_1$ and $N_2$ of the pinion rollers 23 and 63, and the vibration power $P_0$ represented by Equation (12) also changes. In accordance with Equation (12), the vibration power $P_0$ tends to be lower when the products $a_1 \times N_1$ and $a_2 \times N_2$ are smaller.

However, the reduction ratio $e_1$ obtainable in the planetary roller mechanism 12 is limited to a range lower than an upper limit value corresponding to the number $N_1$ of the pinion rollers 23 so that the pinion rollers 23 arranged along the circumferential direction do not interfere with one another. This also holds true with the planetary roller mechanism 52. More specifically, the reduction ratio $e_2$ obtainable in the planetary roller mechanism 52 is limited to a range lower than an upper limit value $\lambda_{N2}$ represented by Equation (15) below. That is, the ratio $\rho_2$ ($=dr_2/ds_2$) between the inner diameter $dr_2$ of the ring roller 62 and the outer diameter $ds_2$ of the sun roller 61 is limited to a range lower than an upper limit value ($\lambda_{N2} - 1$). For example, $\lambda_{N2} = 8 + 4 \times 3^{0.5} \approx 14.93$ when $N_2 = 3$, $\lambda_{N2} = 4 + 2 \times 2^{0.5} \approx 6.83$ when $N_2 = 4$, $\lambda_{N2} = 4.85$ when $N_2 = 5$, and $\lambda_{N2} = 4.0$ when $N_2 = 6$.

$$\lambda_{N2} = (1 + \sin(\pi/N_2))/(1 - \sin(\pi/N_2)) + 1 \qquad (15)$$

According to Nonpatent document 1 in which four pinion rollers are arranged along the circumferential direction, the reduction ratio ranging from the sun roller to the carrier when the ring roller is fixed is limited to a range lower than the upper limit value $(4 + 2 \times 2^{0.5}) \approx 6.83$ in accordance with Equation (15), and a reduction ratio equal to or greater than the upper limit value $(4 + 2 \times 2^{0.5})$ cannot be obtained. Even when the first planetary roller mechanism and the second planetary roller mechanism are connected in series in two stages as in Patent documents 1 and 2 to further increase the reduction ratio, the reduction ratio ranging from the sun roller of the first planetary roller mechanism to the carrier of the second planetary roller mechanism is limited to a range lower than the upper limit value $(4 + 2 \times 2^{0.5})^2 = (24 + 16 \times 2^{0.5}) \approx 46.6$, and a reduction ratio equal to or greater than this upper limit value $(24 + 16 \times 2^{0.5})$ cannot be obtained. In the traction drive mechanism 10 according to the present embodiment, the carrier 24 of the planetary roller mechanism 12 is coupled to the sun roller 61 of the planetary roller mechanism 52, and the planetary roller mechanisms 12 and 52 are connected in series in two stages to increase the total reduction ratio $e_0$. Meanwhile, in order to obtain a high total reduction ratio $e_0$ greater than $(24 + 16 \times 2^{0.5})$ which cannot be obtained by $N_1 = N_2 = 4$, it is necessary to reduce one or more of the numbers $N_1$ and $N_2$ of the pinion rollers 23 and 63 to three or less. However, if the number of the pinion rollers is reduced to three or less, the vibration power $P_0$ represented by Equation (12) is easily increased by the increase of the product of the interference of the planetary roller mechanism and the number of the pinion rollers, as shown in FIG. 7. If the number of the pinion rollers is two or fewer, the position of the sun roller pressed to the pinion roller is not stable, and stable application of press force to each contact portion is difficult.

Figure 8:
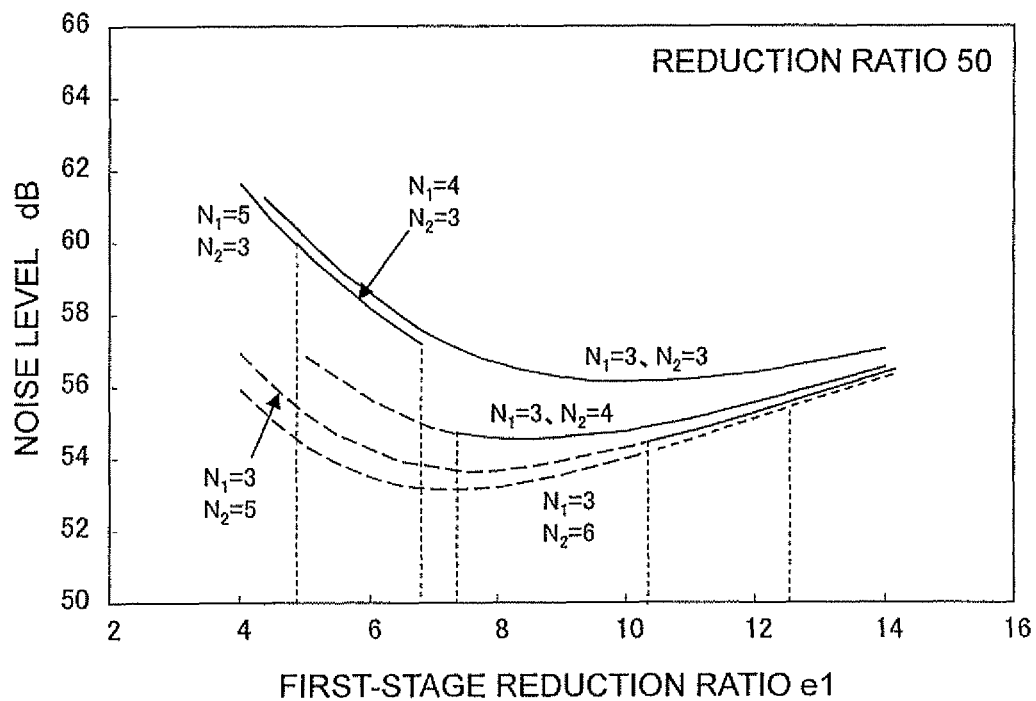
FIG. 8 is a graph illustrating the result of calculation of a noise level attributed to vibration power of all the ring rollers.
Figure 10:
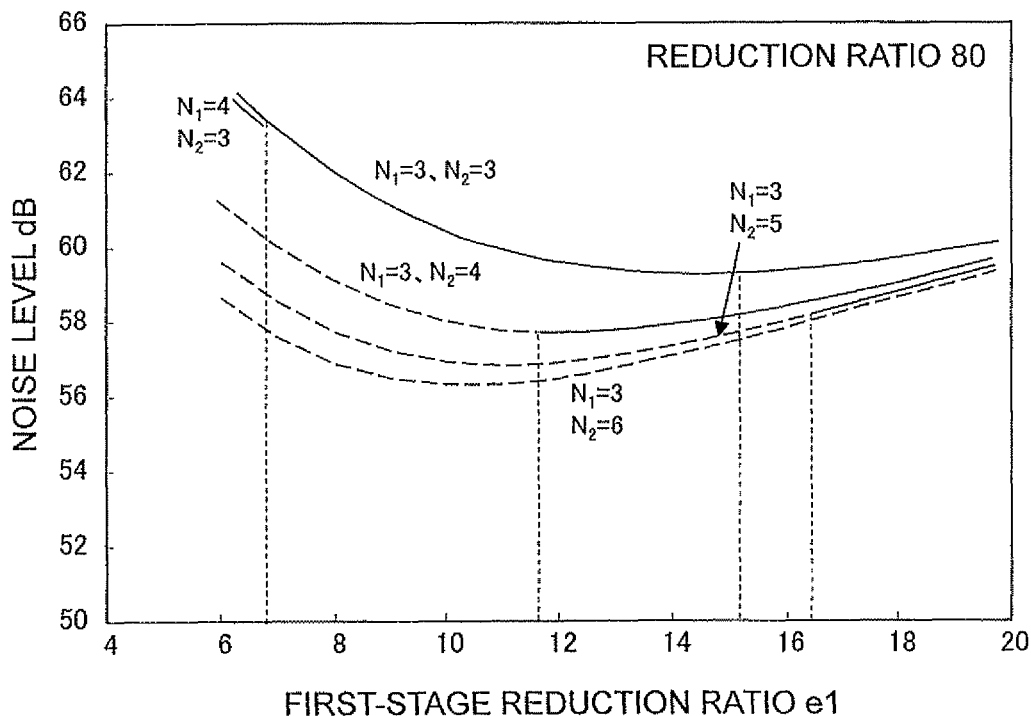
FIG. 10 is a graph illustrating the result of calculation of a noise level attributed to vibration power of all the ring rollers.
Figure 9:
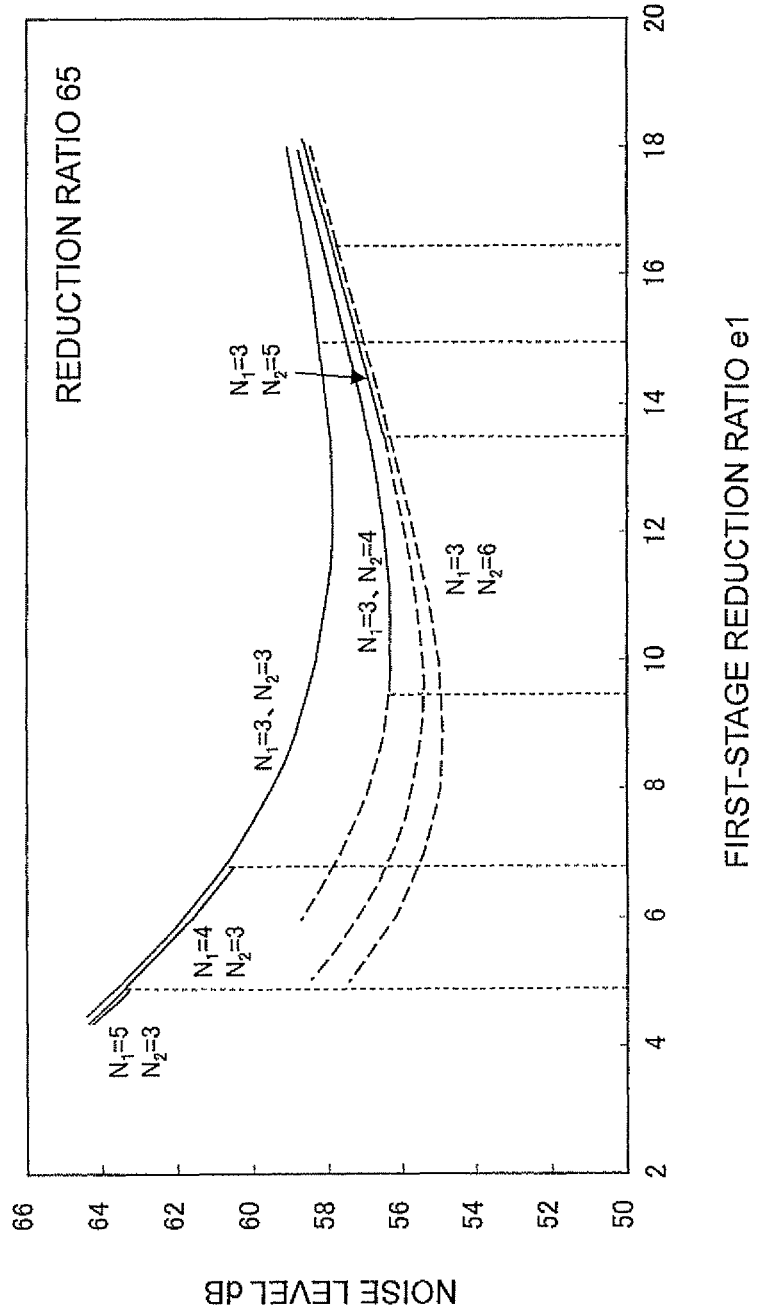
FIG. 9 is a graph illustrating the result of calculation of a noise level attributed to vibration power of all the ring rollers.

FIGS. 8 to 10 show the results of the calculation of the noise level attributed to the vibration power $P_0$ of the ring rollers 22 and 62 when the reduction ratio $e_1$ of the planetary roller mechanism 12 and the numbers $N_1$ and $N_2$ of the pinion rollers 23 and 63 are changed, provided that the total reduction ratio $e_0$ ($e_1 \times e_2$) of the whole traction drive mechanism 10 is greater than $(24+16 \times 2^{0.5})$ and that the rotation speed (input rotation speed) $\omega_{in}$ of the sun roller 21 is constant. FIG. 8 shows the calculation result of the noise level when the total reduction ratio $e_0$ is 50. FIG. 9 shows the calculation result of the noise level when the total reduction ratio $e_0$ is 65. FIG. 10 shows the calculation result of the noise level when the total reduction ratio $e_0$ is 80. When the vibration power $P_0$ represented by Equation (12) is calculated, the inner diameters $dr_1$ and $dr_2$ of the ring rollers 22 and 62 are constant, the input torque $Ts_1$ is constant, and the surface pressures $Ps_1$ and $Ps_2$ in the contact portions 27 and 67 are constant. In accordance with the flowchart in FIG. 5, the masses $M_1$ and $M_2$ of the ring rollers 22 and 62 and the products $a_1 \times N_1$ and $a_2 \times N_2$ are calculated by using the relations shown in FIGS. 6 and 7. When the noise level is calculated, the efficiency $\sigma$ of conversion from vibration to sound is multiplied by the vibration power $P_0$. In FIGS. 8 to 10, solid lines indicate the ranges without interference between the pinion rollers 23 and between the pinion rollers 63, and broken lines indicate the ranges that are not satisfied in effect due to the interference between the pinion rollers 23 or between the pinion rollers 63.

As shown in FIG. 8, provided that $e_0$=50, if $N_1$=3 and $N_2$=3, the noise level (vibration power $P_0$) is minimal (at a lowest point) when the first-stage reduction ratio (first-stage reduction ratio) $e_1$ of the planetary roller mechanism 12 is 10.18. If $N_1$=3 and $N_2$=4, the noise level is minimal (at a lowest point) when the first-stage reduction ratio $e_1$ is 8.55. If $N_1$=3 and $N_2$=5, the noise level is minimal when the first-stage reduction ratio $e_1$ is 10.31. If $N_1$=3 and $N_2$=6, the noise level is minimal when the first-stage reduction ratio $e_1$ is 12.50. When $N_1$=3 and $N_2$=5 and when $N_1$=3 and $N_2$=6, the first-stage reduction ratio $e_1$ at which the noise level is minimal is determined by a condition in which the pinion rollers 63 do not interfere with one another. Meanwhile, if $N_1$=4 and $N_2$=3, the noise level is minimal when the first-stage reduction ratio $e_1$ is 6.83. If $N_1$=5 and $N_2$=3, the noise level is minimal when the first-stage reduction ratio $e_1$ is 4.85. However, the minimal values in these cases are higher than the minimal values when $N_1$=3 and $N_2$=3, when $N_1$=3 and $N_2$=4, when $N_1$=3 and $N_2$=5, and when $N_1$=3 and $N_2$=6.

As shown in FIG. 9, provided that $e_0$=65, if $N_1$=3 and $N_2$=3, the noise level is minimal (at a lowest point) when the first-stage reduction ratio $e_1$ is 12.46. If $N_1$=3 and $N_2$=4, the noise level is minimal (at a lowest point) when the first-stage reduction ratio $e_1$ is 10.43. If $N_1$=3 and $N_2$=5, the noise level is minimal when the first-stage reduction ratio $e_1$ is 13.40. If $N_1$=3 and $N_2$=5, the first-stage reduction ratio $e_1$ at which the noise level is minimal is determined by a condition in which the pinion rollers 63 do not interfere with one another. Meanwhile, if $N_1$=4 and $N_2$=3, the noise level is minimal when the first-stage reduction ratio $e_1$ is 6.83. If $N_1$=5 and $N_2$=3, the noise level is minimal when the first-stage reduction ratio $e_1$ is 4.85. However, the minimal values in these cases are higher than the minimal values when $N_1$=3 and $N_2$=3, when $N_1$=3 and $N_2$=4, and when $N_1$=3 and $N_2$=5.

As shown in FIG. 10, provided that $e_0$=80, if $N_1$=3 and $N_2$=3, the noise level is minimal (at a lowest point) when the first-stage reduction ratio $e_1$ is 14.57. If $N_1$=3 and $N_2$=4, the noise level is minimal (at a lowest point) when the first-stage reduction ratio $e_1$ is 12.20. Meanwhile, if $N_1$=4 and $N_2$=3, the noise level is minimal when the first-stage reduction ratio $e_1$ is 6.83. However, the minimal value in this case is higher than the minimal values when $N_1$=3 and $N_2$=3 and when $N_1$=3 and $N_2$=4.

Figure 11:
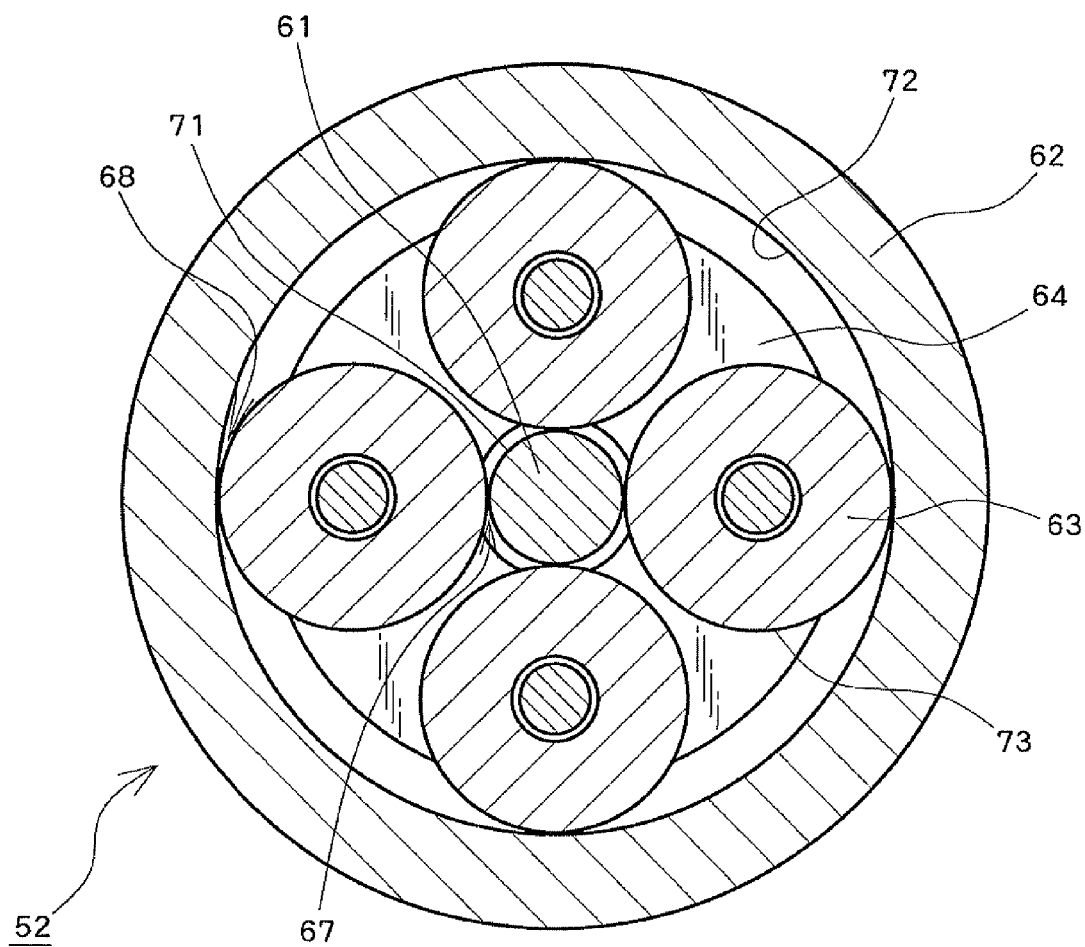
FIG. 11 is a view showing the schematic configuration of the traction drive mechanism according to the embodiment of the present invention.
Figure 12:
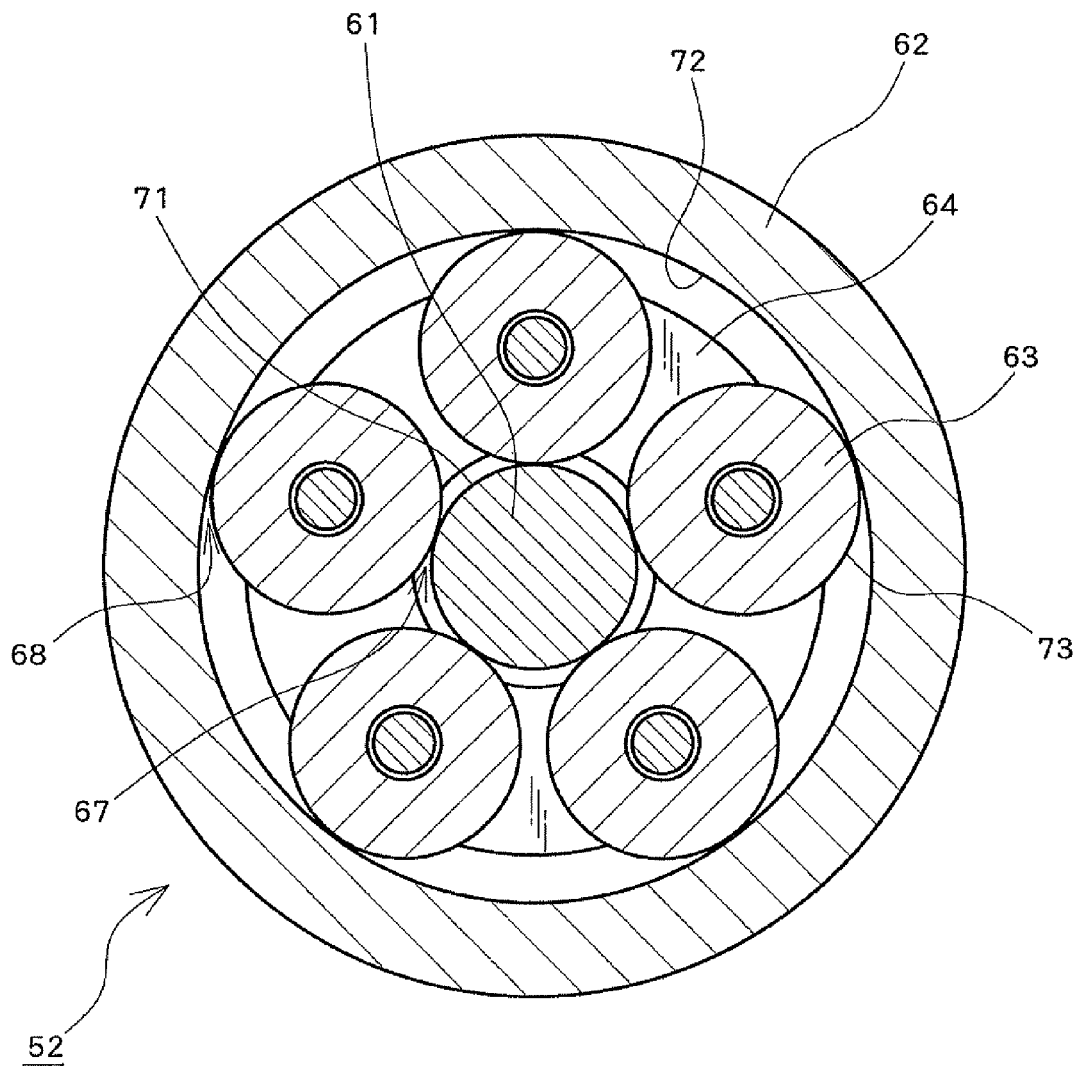
FIG. 12 is a view showing the schematic configuration of the traction drive mechanism according to the embodiment of the present invention.
Figure 13:
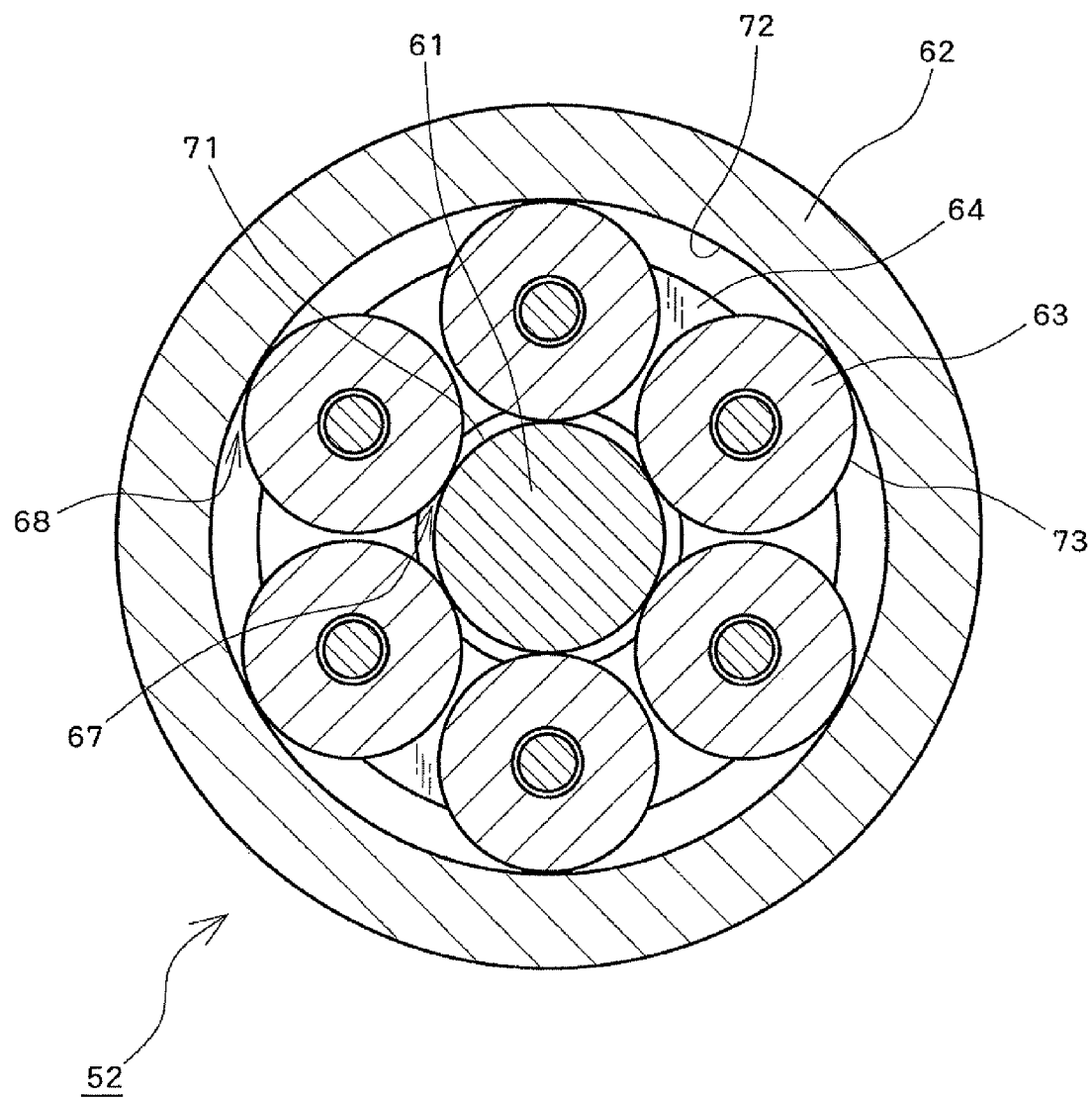
FIG. 13 is a view showing the schematic configuration of the traction drive mechanism according to the embodiment of the present invention.

Accordingly, even when one or more of the products $a_1 \times N_1$ and $a_2 \times N_2$ that have an influence on the vibration power $P_0$ are increased by decreasing one of more of the numbers $N_1$ and $N_2$ of the pinion rollers 23 and 63 to three in order to obtain a high total reduction ratio $e_0$ greater than $(24+16 \times 2^{0.5})$ which cannot be obtained by $N_1$=$N_2$=4, the noise level (vibration power $P_0$) can be reduced by adjusting the reduction ratio $e_1$ of the planetary roller mechanism 12. Moreover, the minimal value of the noise level can be lower when at least the number $N_1$ of the pinion rollers 23 of the planetary roller mechanism 12 is reduced to three than when the number $N_2$ of the pinion rollers 63 of the planetary roller mechanism 52 is reduced to three. In addition, if the number $N_2$ of the pinion rollers 63 of the planetary roller mechanism 52 is increased to reduce the interference $a_2$, the minimal value of the noise level can be further reduced. However, if the number $N_2$ of the pinion rollers 63 is increased to seven or more, the decrease rate of the interference $a_2$ is lower than the increase rate of the number $N_2$ of the pinion rollers 63. As a result, the product $a_2 \times N_2$ that has an influence on the vibration power $P_0$ is increased, and the reduction effect of the vibration power $P_0$ resulting from the increase of the number $N_2$ of the pinion rollers 63 cannot be obtained. Thus, according to the present embodiment, the number $N_1$ of the pinion rollers 23 arranged along the circumferential direction is set to three, and the number $N_2$ of the pinion rollers 63 arranged along the circumferential direction is set to three or more and six or fewer. FIG. 3 shows an example in which the number $N_2$ of the pinion rollers 63 arranged along the circumferential direction is three. FIG. 11 shows an example in which the number $N_2$ of the pinion rollers 63 arranged along the circumferential direction is four. FIG. 12 shows an example in which the number $N_2$ of the pinion rollers 63 arranged along the circumferential direction is five. FIG. 13 shows an example in which the number $N_2$ of the pinion rollers 63 arranged along the circumferential direction is six.

A human being can hardly perceive a change in noise level of about 1 dB. Thus, according to the present embodiment, the reduction ratio $e_1$ of the planetary roller mechanism 12 is set to a range in which the noise level (vibration power $P_0$) varies from the minimal value to +1 dB, relative to the set numbers $N_1$ and $N_2$ of the pinion rollers 23 and 63. The range of the reduction ratio $e_1$ of the planetary roller mechanism 12 is described below.

In the case shown in. FIGS. 2 and 3 in which $N_1$=3 and $N_2$=3, the range of the reduction ratio (first-stage reduction ratio) $e_1$ of the planetary roller mechanism 12 in which the noise level varies from the minimal value to +1 dB or less has a lower limit value of 7.27 and an upper limit value of 14.27 provided that $e_0$=50 as shown in FIG. 8. Provided that $e_0$=65 as shown in FIG. 9, the range of the first-stage reduction ratio $e_1$ in which the noise level varies from the minimal value to +1 dB or less has a lower limit value of 8.87 and an upper limit value of 14.93 ($\approx 8+4 \times 3^{0.5}$). Provided that $e_0$=80 as shown in FIG. 10, the range of the first-stage reduction ratio $e_1$ in which the noise level varies from the minimal value to +1 dB or less has a lower limit value of 10.33 and an upper limit value of 14.93 ($\approx 8+4 \times 3^{0.5}$). Provided that $e_0$=65 and 80, the upper limit value of the range of the first-stage reduction ratio $e_1$ is determined by a condition in which the pinion rollers 63 do not interfere with one another.

In the case shown in FIGS. 2 and 11 in which $N_1=3$ and $N_2=4$ the range of the first-stage reduction ratio $e_1$ in which the noise level varies from the minimal value to +1 dB or less has a lower limit value of 7.32 ($\approx 25-12.5 \times 2^{0.5}$) and an upper limit value of 11.48 provided that $e_0=50$ as shown in FIG. 8. Provided that $e_0=65$ as shown in FIG. 9, the range of the first-stage reduction ratio $e_1$ in which the noise level varies from the minimal value to +1 dB or less has a lower limit value of 9.52 ($\approx 32.5-16.25 \times 2^{0.5}$) and an upper limit value of 14.57. Provided that $e_0=80$ as shown in FIG. 10, the range of the first-stage reduction ratio $e_1$ in which the noise level varies from the minimal value to +1 dB or less has a lower limit value of 11.72 ($\approx 40-20 \times 2^{0.5}$) and an upper limit value of 14.93 ($\approx 8+4 \times 3^{0.5}$). Provided that $e_0=50$, 65, and 80, the lower limit value of the range of the first-stage reduction ratio $e_1$ is determined by a condition in which the pinion rollers 63 do not interfere with one another. Provided that $e_0=80$, the upper limit value of the range of the first-stage reduction ratio $e_1$ is determined by a condition in which the pinion rollers 23 do not interfere with one another.

When $N_1=3$ and $N_2=5$, the range of the first-stage reduction ratio $e_1$ in which the noise level varies from the minimal value to +1 dB or less has a lower limit value of 10.31 and an upper limit value of 12.26 provided that $e_0=50$ as shown in FIG. 8. Provided that $e_0=65$ as shown in FIG. 9, the range of the first-stage reduction ratio $e_1$ in which the noise level varies from the minimal value to +1 dB or less has a lower limit value of 13.40 and an upper limit value of 14.93 ($\approx 8+4 \times 2^{0.5}$). Provided that $e_0=50$ and 65, the lower limit value of the range of the first-stage reduction ratio $e_1$ is determined by a condition in which the pinion rollers 63 do not interfere with one another. Provided that $e_0=65$, the upper limit value of the range of the first-stage reduction ratio $e_1$ is determined by a condition in which the pinion rollers 23 do not interfere with one another.

When $N_1=3$ and $N_2=6$, the range of the first-stage reduction ratio $e_1$ in which the noise level varies from the minimal value to +1 dB or less has a lower limit value of 12.50 and an upper limit value of 14.19 provided that $e_0=50$ as shown in FIG. 8. Provided that $e_0=50$, the lower limit value of the range of the first-stage reduction ratio $e_1$ is determined by a condition in which the pinion rollers 63 do not interfere with one another.

Figure 14:
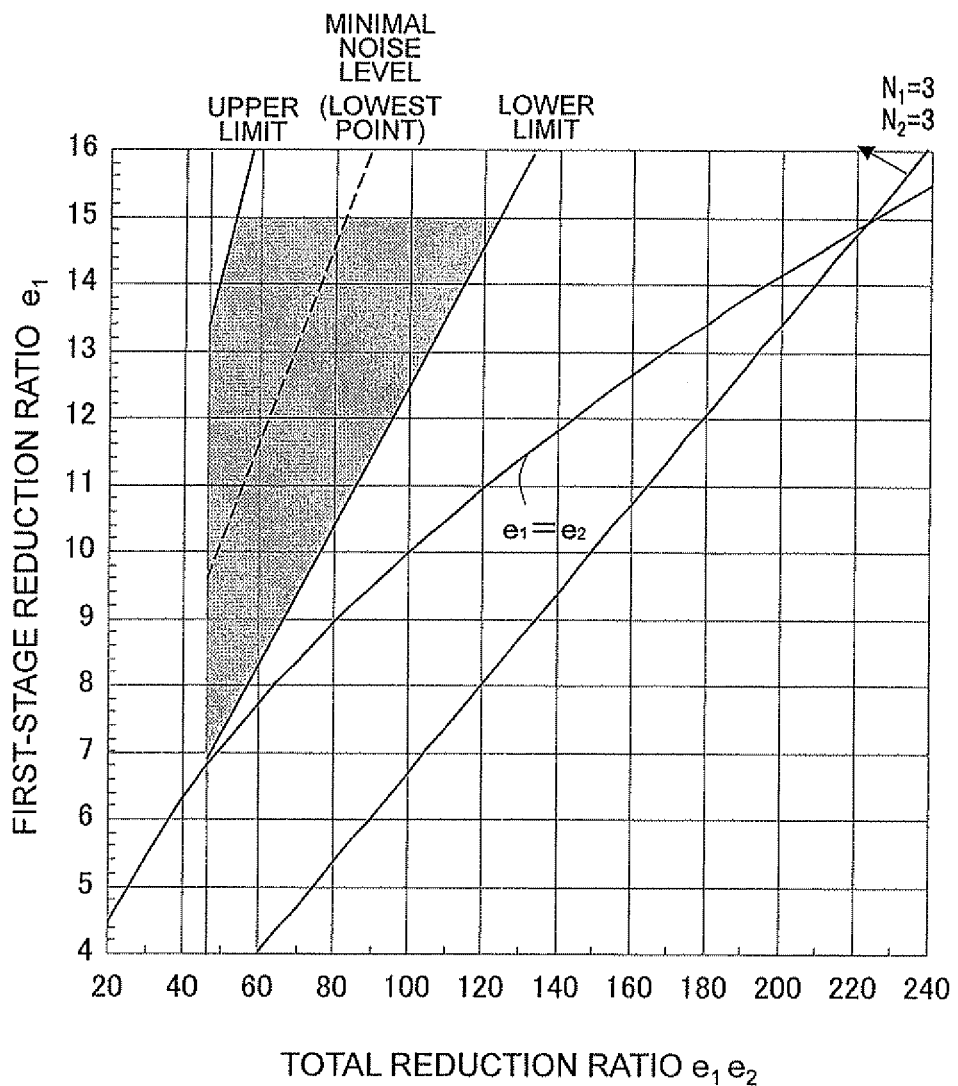
FIG. 14 is a graph illustrating the range of the reduction ratio of the traction drive mechanism according to the embodiment of the present invention.
Figure 15:
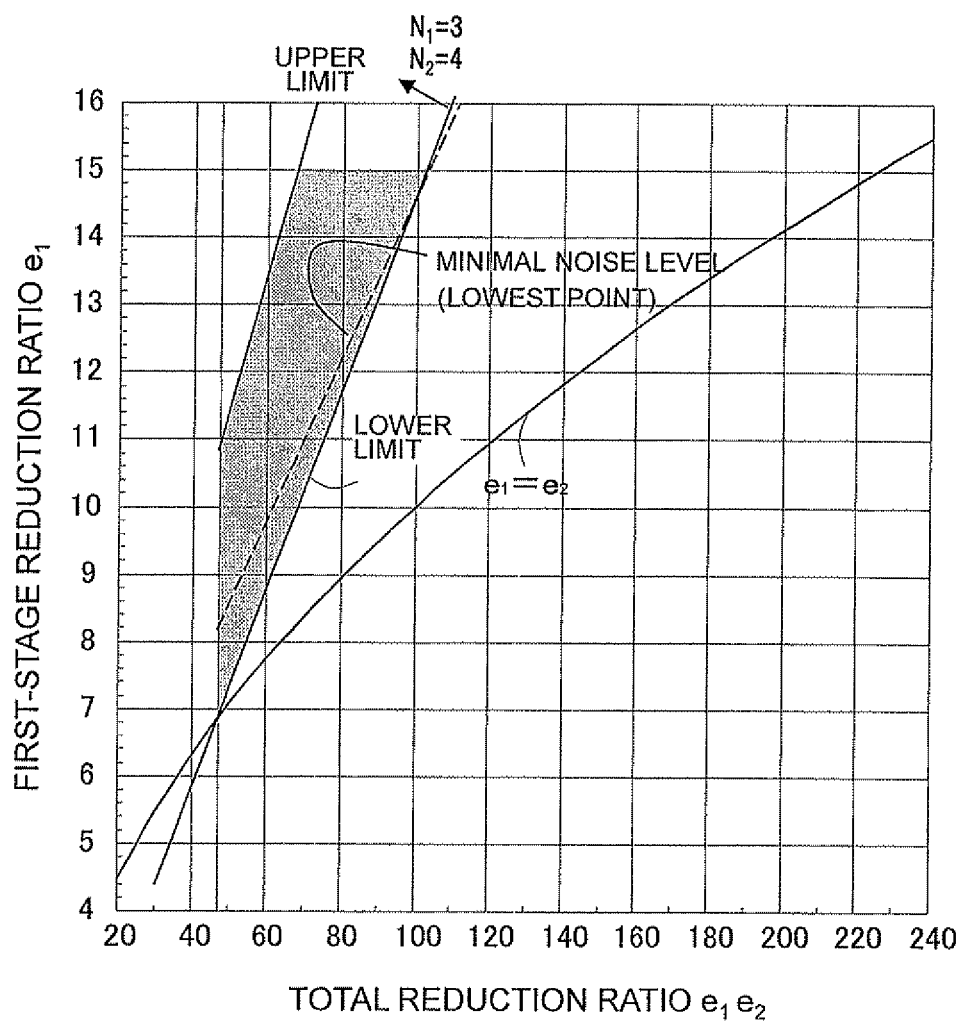
FIG. 15 is a graph illustrating the range of the reduction ratio of the traction drive mechanism according to the embodiment of the present invention.
Figure 16:
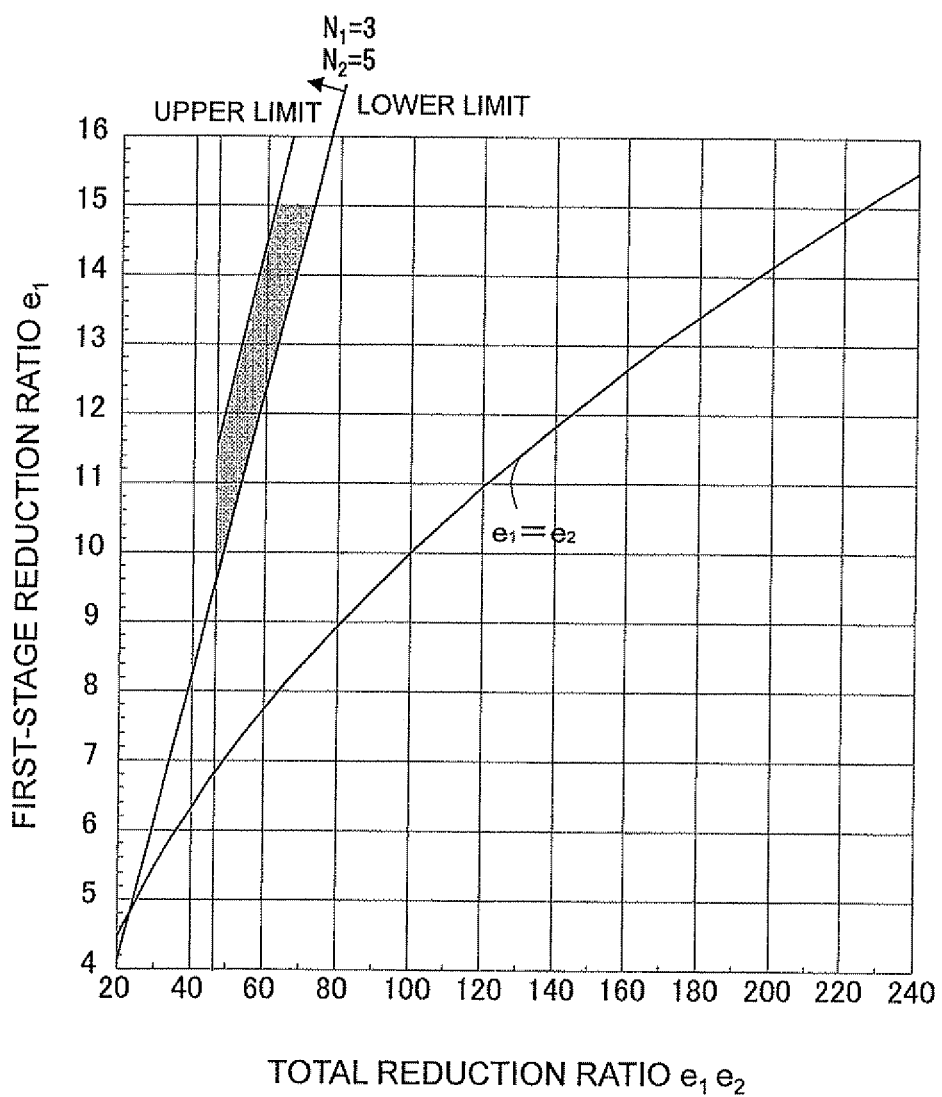
FIG. 16 is a graph illustrating the range of the reduction ratio of the traction drive mechanism according to the embodiment of the present invention.
Figure 17:
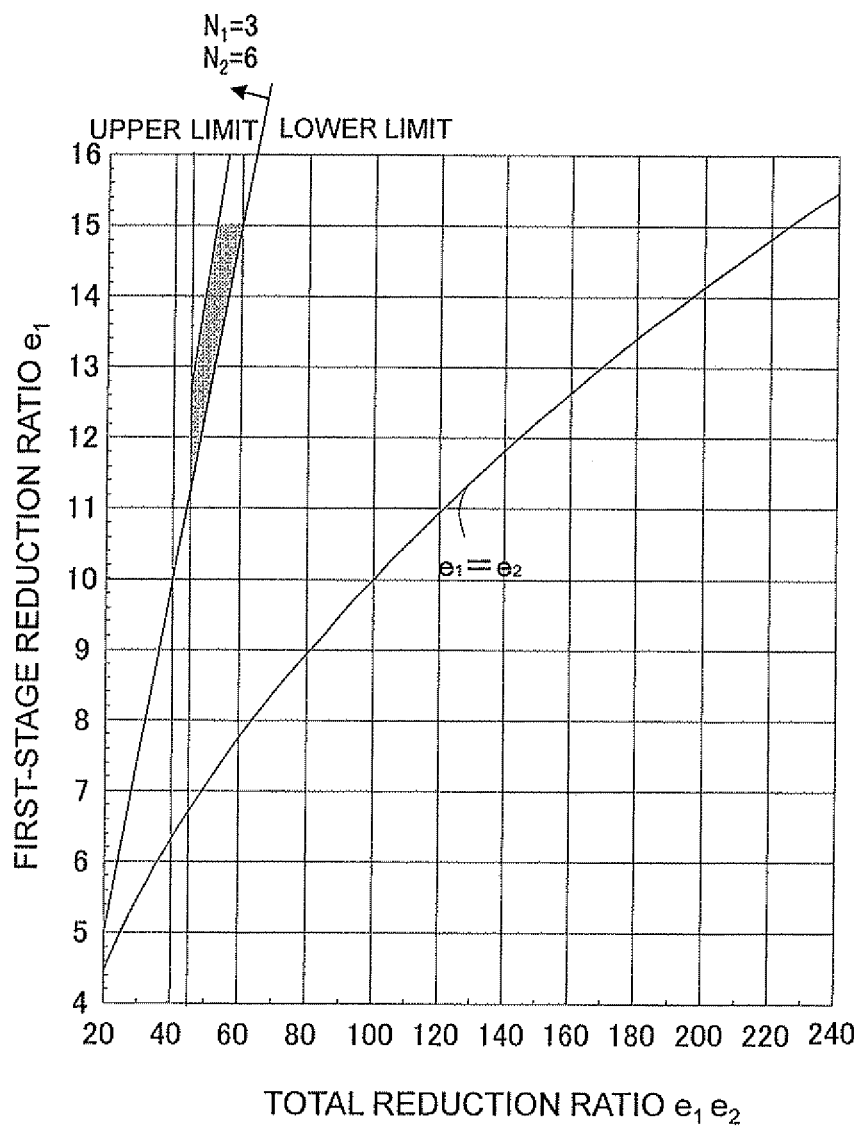
FIG. 17 is a graph illustrating the range of the reduction ratio of the traction drive mechanism according to the embodiment of the present invention.

FIGS. 14 to 17 show the calculation results of the examination of the range of the reduction ratio $e_1$ (first-stage reduction ratio) $e_1$ of the planetary roller mechanism 12 in which the noise level varies from the minimal value to +1 dB or less when the total reduction ratio $e_0$ ($=e_1 \times e_2$) is changed within a range of $(24+16 \times 2^{0.5})$ or more provided that $N_1=3$ and $N_2=3$ to 6. FIG. 14 shows the calculation result when $N_1=3$ and $N_2=3$. FIG. 15 shows the calculation result when $N_1=3$ and $N_2=4$. FIG. 16 shows the calculation result when $N_1=3$ and $N_2=5$. FIG. 17 shows the calculation result when $N_1=3$ and $N_2=6$. The shaded portions in FIGS. 14 to 17 indicate the relation between the total reduction ratio $e_0$, and the first-stage reduction ratio $e_1$ in which the noise level varies from the minimal value to +1 dB or less relative to the set numbers $N_1$ and $N_2$ of the pinion rollers 23 and 63.

When $N_1=3$ and $N_2=3$, the range of the shaded portion in FIG. 14 can be indicated by Equations (16) to (18) below. However, in Equation (18), $\min[0.204 \times e_0+4.123, 8+4 \times 3^{0.5}]$ indicates the value of a smaller one of $(0.204 \times e_0+4.123)$ and $(8+4 \times 3^{0.5})$. If $e_0 \leq 53.0$, then $e_1 \leq 0.204 \times e_0+4.123$. If $e_0 > 53.0$, then $e_1 \leq 8+4 \times 3^{0.5}$.

$$e_0 \geq 24+16 \times 2^{0.5} \tag{16}$$

$$e_1 \geq 0.102 \times e_0+2.196 \tag{17}$$

$$e_1 \leq \min[0.204 \times e_0+4.123, 8+4 \times 3^{0.5}] \tag{18}$$

Equations (16) to (18) can be transformed into Equations (19) to (21) below by using the ratio $\rho_1$ ($=dr_1/ds_1$) between the inner diameter $dr_1$ of the ring roller 22 and the outer diameter $ds_1$ of the sun roller 21 and the ratio $\rho_2$ ($=dr_2/ds_2$) between the inner diameter $dr_2$ of the ring roller 62 and the outer diameter $ds_2$ of the sun roller 61. However, in Equation (21), $\min[0.204 \times (\rho_1+1) \times (\rho_2+1)+3.123, 7+4 \times 3^{0.5}]$ indicates the value of a smaller one of $(0.204 \times (\rho_1+1) \times (\rho_2+1)+3.123)$ and $(7+4 \times 3^{0.5})$. If $(\rho_1+1) \times (\rho_2+1) \leq 53.0$, then $\rho_1 \leq 0.204 \times (\rho_1+1) \times (\rho_2+1)+3.123$. If $(\rho_1+1) \times (\rho_2+1) > 53.0$, then $\rho_1 \leq 7+4 \times 3^{0.5}$.

$$(\rho_1+1) \times (\rho_2+1) \geq 24+16 \times 2^{0.5} \tag{19}$$

$$\rho_1 \geq 0.102 \times (\rho_1+1) \times (\rho_2+1)+1.196 \tag{20}$$

$$\rho_1 \leq \min[0.204 \times (\rho_1+1) \times (\rho_2+1)+3:123, 7+4 \times 3^{0.5}] \tag{21}$$

In the traction drive mechanism 10 according to the present embodiment, when $N_1=3$ and $N_2=3$, $\rho_1$ and $\rho_2$ ($e_1$ and $e_2$) are set to ranges that satisfy Equations (19) to (21) (Equations (16) to (18)) so that the noise level varies from the minimal value to +1 dB or less. This makes it possible to reduce the noise level (vibration power $P_0$), and also obtain a high total reduction ratio $e_0$ greater than $(24+16 \times 2^{0.5})$ which cannot be obtained by $N_1=N_2=4$. When $N_1=3$ and $N_2=3$, the maximal value of the total reduction ratio $e_0$ is 124.8.

A broken line in FIG. 14 indicates the relation between the total reduction ratio $e_0$ and the first-stage reduction ratio $e_1$ in which the noise level is at the minimal value (lowest point) relative to the set numbers $N_1$ and $N_2$ of the pinion rollers 23 and 63. When $N_1=3$ and $N_2=3$, the broken line in FIG. 14 can be represented by Equation (22) below, which can further be transformed into Equation (23) below. When $N_1=3$ and $N_2=3$, it is preferable to set $\rho_1$ and $\rho_2$ ($e_1$ and $e_2$) so that Equation (23) (Equation (22)) is substantially satisfied, in order to further reduce the noise level.

$$e_1=0.146 \times e_0+2.890 \tag{22}$$

$$\rho_1=0.146 \times (\rho_1+1) \times (\rho_2+1)+1.890 \tag{23}$$

When $N_1=3$ and $N_2=4$, the range of the shaded portion in FIG. 15 can be indicated by Equation (16) above and Equations (24) to (25) below. However, in Equation (25), $\min[0.185 \times e_0+2.320, 8+4 \times 3^{0.5}]$ indicates the value of a smaller one of $(0.185 \times e_0+2.320)$ and $(8+4 \times 3^{0.5})$. If $e_0 \leq 68.2$, then $e_1 \leq 0.185 \times e_0+2.320$. If $e_0 > 68.2$, then $e_1 \leq 8+4 \times 3^{0.5}$.

$$e_1 \geq (2-2^{0.5}) \times e_0/4 \tag{24}$$

$$e_1 \leq \min[0.185 \times e_0+2.320, 8+4 \times 3^{0.5}] \tag{25}$$

Equations (24) and (25) can be transformed into Equations (26) and (27) below. However, in Equation (27), $\min[0.185 \times (\rho_1+1) \times (\rho_2+1)+1.320, 7+4 \times 3^{0.5}]$ indicates the value of a smaller one of $(0.185 \times (\rho_1+1) \times (\rho_2+1)+1.320)$ and $(7+4 \times 3^{0.5})$. If $(\rho_1+1) \times (\rho_2+1) \leq 68.2$, then $\rho_1 \leq 0.185 \times (\rho_1+1) \times (\rho_2+1)+1.320$. If $(\rho_1+1) \times (\rho_2+1) > 68.2$, then $\rho_1 \leq 7+4 \times 3^{0.5}$.

$$\rho_1 \geq (2-2^{0.5}) \times (\rho_1+1) \times (\rho_2+1)/4-1 \tag{26}$$

$$\rho_1 \leq \min[0.185 \times (\rho_1+1) \times (\rho_2+1)+1.320, 7+4 \times 3^{0.5}] \tag{27}$$

In the traction drive mechanism 10 according to the present embodiment, when $N_1=3$ and $N_2=4$, $\rho_1$ and $\rho_2$ ($e_1$ and $e_2$) are set to ranges that satisfy Equations (19), (26), and (27) (Equations (16), (24), and (25)). This again makes it possible to reduce the noise level (vibration power $P_0$), and also obtain a high total reduction ratio $e_0$ greater than $(24+16\times2^{0.5})$ which cannot be obtained by $N_1=N_2=4$. When $N_1=3$ and $N_2=4$, the maximal value of the total reduction ratio $e_0$ is 101.9.

A broken line in FIG. 15 indicates the relation between the total reduction ratio $e_0$ and the first-stage reduction ratio $e_1$ in which the noise level is at the minimal value (lowest point) relative to the set numbers $N_1$ and $N_2$ of the pinion rollers 23 and 63. When $N_1=3$ and $N_2=4$, the broken line in FIG. 15 can be represented by Equation (28) below, which can further be transformed into Equation (29) below. When $N_1=3$ and $N_2=4$, it is preferable to set $\rho_1$ and $\rho_2$ ($e_1$ and $e_2$) so that Equation (29) (Equation (28)) is substantially satisfied, in order to further reduce the noise level.

$$e_1=0.122\times e_0+2.488 \tag{28}$$

$$\rho_1=0.122\times(\rho_1+1)\times(\rho_2+1)+1.488 \tag{29}$$

When $N_1=3$ and $N_2=5$, the range of the shaded portion in FIG. 16 can be indicated by Equation (16) above and Equations (30) to (31) below. However, in Equation (31), min $[0.234\times e_0+0.520, 8+4\times3^{0.5}]$ indicates the value of a smaller one of $(0.234\times e_0+0.520)$ and $(8+4\times3^{0.5})$. If $e_0\leq61.6$, then $e_1\leq0.234\times e_0+0.520$. If $e_0>61.6$, then $e_1\leq8+4\times3^{0.5}$.

$$e_1\geq0.206\times e_0 \tag{30}$$

$$e_1\leq\min[0.234\times e_0+0.520, 8+4\times3^{0.5}] \tag{31}$$

Equations (30) and (31) can be transformed into Equations (32) and (33) below. However, in Equation (33), min$[0.234\times(\rho_1+1)\times(\rho_2+1)-0.480, 7+4\times3^{0.5}]$ indicates the value of a smaller one of $(0.234\times(\rho_1+1)\times(\rho_2+1)-0.480)$ and $(7+4\times3^{0.5})$. If $(\rho_1+1)\times(\rho_2+1)>61.6$, then $\rho_1\leq0.234\times(\rho_1+1)\times(\rho_2+1)-0.480$. If $(\rho_1+1)\times(\rho_21+1)>61.6$, then $\rho_1\leq7+4\times3^{0.5}$.

$$\rho_1\geq0.206\times(\rho_1+1)\times(\rho_2+1)-1 \tag{32}$$

$$\rho_1\leq\min[0.234\times(\rho_1+1)\times(\rho_2+1)-0.480, 7+4\times3^{0.5}] \tag{33}$$

In the traction drive mechanism 10 according to the present embodiment, when $N_1=3$ and $N_2=5$, $\rho_1$ and $\rho_2$ ($e_1$ and $e_2$) are set to ranges that satisfy Equations (19), (32), and (33) (Equations (16), (30), and (31)). This again makes it possible to reduce the noise level (vibration power $P_0$), and also obtain a high total reduction ratio $e_0$ greater than $(24+16\times2^{0.5})$ which cannot be obtained by $N_1=N_2=4$. When $N_1=3$ and $N_2=5$, the maximal value of the total reduction ratio $e_0$ is 72.4.

Furthermore, when $N_1=3$ and $N_2=5$, the noise level decreases from the upper limit to the lower limit of the shaded portion in FIG. 16. Therefore, in order to further reduce the noise level, it is preferable to set $\rho_1$ and $\rho_2$ ($e_1$ and $e_2$) so that $\rho_1=0.206\times(\rho_1+1)\times(\rho_2+1)-1(e_1=0.206\times e_0)$ is substantially satisfied. In this case, five pinion rollers 63 are arranged along the circumferential direction at such small intervals that no traction force may be generated between the pinion rollers 63 adjacent in the circumferential direction.

When $N_1=3$ and $N_2=6$, the range of the shaded portion in FIG. 17 can be indicated by Equation (16) above and Equations (34) to (35) below. However, in Equation (35), min $[0.278\times e_0+0.397, 8+4\times3^{0.5}]$ indicates the value of a smaller one of $(0.278\times e_0+0.397)$ and $(8+4\times3^{0.5})$. If $e_0\leq52.3$, then $e_1\leq0.278\times e_0+0.397$. If $e_0>52.3$, then $e_1\leq8+4\times3^{0.5}$.

$$e_1\geq0.25\times e_0 \tag{34}$$

$$e_1\leq\min[0.278\times e_0+0.397, 8+4\times3^{0.5}] \tag{35}$$

Equations (34) and (35) can be transformed into Equations (36) and (37) below. However, in Equation (37), min$[0.278\times(\rho_1+1)\times(\rho_2+1)-0.603, 7+4\times3^{0.5}]$ indicates the value of a smaller one of $(0.278\times(\rho_1+1)\times(\rho_2+1)-0.603)$ and $(7+4\times3^{0.5})$. If $(\rho_1+1)\times(\rho_2+1)\leq52.3$, then $\rho_1\leq0.278\times(\rho_1+1)\times(\rho_2+1)-0.603$. If $(\rho_1+1)\times(\rho_2+1)>52.3$, then $\rho_1\leq7+4\times3^{0.5}$.

$$\rho_1\geq0.25\times(\rho_1+1)\times(\rho_2+1)-1 \tag{36}$$

$$\rho_1\leq\min[0.278\times(\rho_1+1)\times(\rho_2+1)-0.603, 7+4\times3^{0.5}] \tag{37}$$

In the traction drive mechanism 10 according to the present embodiment, when $N_1=3$ and $N_2=6$, $\rho_1$ and $\rho_2$ ($e_1$ and $e_2$) are set to ranges that satisfy Equations (19), (36), and (37) (Equations (16), (34), and (35)). This again makes it possible to reduce the noise level (vibration power $P_0$), and also obtain a high total reduction ratio $e_0$ greater than $(24+16\times2^{0.5})$ which cannot be obtained by $N_1=N_2=4$. When $N_1=3$ and $N_2=6$, the maximal value of the total reduction ratio $e_0$ is 59.7.

Furthermore, when $N_1=3$ and $N_2=6$, the noise level decreases from the upper limit to the lower limit of the shaded portion in FIG. 17. Therefore, in order to further reduce the noise level, it is preferable to set $\rho_1$ and $\rho_2$ ($e_1$ and $e_2$) so that $\rho_1=0.25\times(\rho_1+1)\times(\rho_2+1)-1(e_1=0.25\times e_0)$ is substantially satisfied. In this case, six pinion rollers 63 are arranged along the circumferential direction at such small intervals that no traction force may be generated between the pinion rollers 63 adjacent in the circumferential direction.

As described above, according to the present embodiment, it is possible to reduce vibrations and noise resulting from the repeated diametrical deformation of the ring rollers 22 and 62, and also increase the total reduction ratio $e_0$ of the whole traction drive mechanism 10 without an increase in size of the structure of the traction drive mechanism 10.

According to the present embodiment, it is also possible to fix the carrier 24 and the ring roller 62 to the casing 20 to constrain their rotations, and mechanically couple the ring roller 22 to the sun roller 61 to transmit power between the sun roller 21 and the carrier 64 with reduced speed (transmit power from the sun roller 21 to the carrier 64 with reduced speed). It is also possible to fix the ring roller 22 and the carrier 64 to the casing 20 to constrain their rotations, and mechanically couple the carrier 24 to the sun roller 61 to transmit power between the sun roller 21 and the ring roller 62 with reduced speed (transmit power from the sun roller 21 to the ring roller 62 with reduced speed). It is also possible to fix the carriers 24 and 64 to the casing 20 to constrain their rotations, and mechanically couple the ring roller 22 to the sun roller 61 to transmit power between the sun roller 21 and the ring roller 62 with reduced speed (transmit power from the sun roller 21 to the ring roller 62 with reduced speed).

While the mode for carrying out the present invention has been described above, the present invention is not in the least limited to such a mode. It should be understood that various modes can be carried out without departing from the spirit of the present invention.

[Description of Reference Numbers]

10: traction drive mechanism, 12 and 52: planetary roller mechanisms, casing 21 and 61: sun rollers, 22 and 62: ring rollers, 23 and 63: pinion rollers, 24 and 64: carriers, 27, 28, 67, and 68: contact portions.

The invention claimed is:

1. A traction drive mechanism comprising a first planetary roller mechanism and a second planetary roller mechanism that are connected in series, the first planetary roller mechanism including a plurality of first planetary rollers rotatably supported by a first carrier, the first planetary rollers being held in contact between a first sun roller and a first ring roller, the second planetary roller mechanism including a plurality of second planetary rollers rotatably supported by a second carrier, and the second planetary rollers being held in contact between a second sun roller and a second ring roller, wherein $N_1=3, N_2=3, 4, 5, \text{ or } 6,$ and $(\rho_1+1) \times (\rho_2+1) \geq 24 + 16 \times 2^{0.5}$ in which $N_1$ is the number of the first planetary rollers, $N_2$ is the number of the second planetary rollers, $\rho_1$ is the ratio between the inner diameter of the first ring roller and the outer diameter of the first sun roller, and $\rho_2$ is the ratio between the inner diameter of the second ring roller and the outer diameter of the second sun roller, and provided that $N_2=3$, $\rho_1 \geq 0.102 \times (\rho_1+1) \times (\rho_2+1) + 1.196,$ and $\rho_1 \leq \min[0.204 \times (\rho_1+1) \times (\rho_2+1) + 3.123, 7+4 \times 3^{0.5}]$ when a value of a smaller one of $(0.204 \times (\rho_1+1) \times (\rho_2+1) + 3.123)$ and $(7+4 \times 3^{0.5})$ is $\min[0.204 \times (\rho_1+1) \times (\rho_2+1)+3.123, 7+4 \times 3^{0.5}]$, or provided that $N_2=4$, $\rho_1 \geq (2-2^{0.5}) \times (\rho_1+1) \times (\rho_2+1)/4 - 1,$ and $\rho_1 \leq \min[0.185 \times (\rho_1+1) \times (\rho_2+1) + 1.320, 7+4 \times 3^{0.5}]$ when a value of a smaller one of $(0.185 \times (\rho_1+1) \times (\rho_2+1) + 1.320)$ and $(7+4 \times 3^{0.5})$ is $\min[0.185 \times (\rho_1+1) \times (\rho_2+1)+1.320, 7+4 \times 3^{0.5}]$, or provided that $N_2=5$, $\rho_1 \geq 0.206 \times (\rho_1+1) \times (\rho_2+1) - 1,$ and $\rho_1 \leq \min[0.234 \times (\rho_1+1) \times (\rho_2+1) - 0.480, 7+4 \times 3^{0.5}]$ when a value of a smaller one of $(0.234 \times (\rho_1+1) \times (\rho_2+1) - 0.480)$ and $(7+4 \times 3^{0.5})$ is $\min[0.234 \times (\rho_1+1) \times (\rho_2+1)-0.480, 7+4 \times 3^{0.5}]$, or provided that $N_2=6$, $\rho_1 \geq 0.25 \times (\rho_1+1) \times (\rho_2+1) - 1,$ and $\rho_1 \leq \min[0.278 \times (\rho_1+1) \times (\rho_2+1) - 0.603, 7+4 \times 3^{0.5}]$ when a value of a smaller one of $(0.278 \times (\rho_1+1) \times (\rho_2+1) - 0.603)$ and $(7+4 \times 3^{0.5})$ is $\min[0.278 \times (\rho_1+1) \times (\rho_2+1)-0.603, 7+4 \times 3^{0.5}]$.

2. The traction drive mechanism according to claim 1, wherein the second sun roller is coupled to the first carrier, and
the rotations of the first and second ring rollers are constrained.

* * * * *

UNITED STATES PATENT AND TRADEMARK OFFICE
CERTIFICATE OF CORRECTION

PATENT NO.         : 8,771,126 B2                                    Page 1 of 1
APPLICATION NO.    : 13/811097
DATED              : July 8, 2014
INVENTOR(S)        : Yoshihiro Mizuno et al.

It is certified that error appears in the above-identified patent and that said Letters Patent is hereby corrected as shown below:

In The Specification

Col. 8, line 43, change "[Expression 1]" to $$\begin{aligned}
P_0 &= \int_0^{2\pi} (m_1 v_1 + m_2 v_2) d\theta \\
&= \int_0^{2\pi} (m_1 \dot{r}_1 + m_2 \dot{r}_2) d\theta \\
&= M_1 \frac{a_1 \omega_1}{\sqrt{2}} + M_2 \frac{a_2 \omega_2}{\sqrt{2}} \\
&= \frac{\omega_{in}}{e_1} \frac{M_1 a_1 N_1}{\sqrt{2}} + \frac{\omega_{in}}{e_1 e_2} \frac{M_2 a_2 N_2}{\sqrt{2}} \quad (12)
\end{aligned}$$

--.

Signed and Sealed this
Twenty-eighth Day of June, 2016

Michelle K. Lee
*Director of the United States Patent and Trademark Office*